United States Patent [19]

Linkiewicz

[11] Patent Number: 5,852,920
[45] Date of Patent: Dec. 29, 1998

[54] LONGITUDINAL SEAM SEALER FOR CONTINUOUS MOTION FORM, FILL AND SEAL MACHINE

[75] Inventor: John M. Linkiewicz, Prospect Heights, Ill.

[73] Assignee: Triangle Package Machinery Company, Chicago, Ill.

[21] Appl. No.: 984,812

[22] Filed: Dec. 4, 1997

Related U.S. Application Data

[63] Continuation-in-part of Ser. No. 747,274, Nov. 13, 1996, Pat. No. 5,752,370.

[51] Int. Cl.$^6$ ....................................................... B65B 9/08
[52] U.S. Cl. ............................. 53/551; 53/550; 53/374.5; 53/374.6
[58] Field of Search ................................ 53/371.5, 371.6, 53/374.5, 374.6, 450, 451, 550, 551, 552

[56] References Cited

U.S. PATENT DOCUMENTS

| 4,750,313 | 6/1988 | Kammler et al. | 53/552 X |
| 4,947,618 | 8/1990 | Schneider et al. | 53/552 X |
| 5,001,891 | 3/1991 | Abate | 53/551 |
| 5,203,145 | 4/1993 | Kammler et al. | 53/552 |
| 5,279,098 | 1/1994 | Fukuda | 53/551 X |
| 5,347,795 | 9/1994 | Fukuda | 53/552 |
| 5,412,927 | 5/1995 | Miyazaki et al. | 53/552 |
| 5,440,860 | 8/1995 | Meli et al. | 53/551 X |
| 5,463,850 | 11/1995 | Fukuda | 53/551 |
| 5,685,131 | 11/1997 | Spatolisano et al. | 53/550 |

*Primary Examiner*—Daniel B. Moon
*Attorney, Agent, or Firm*—Brinks Hofer Gilson & Lione

[57] ABSTRACT

A form-fill-seal machine in which an heated longitudinal seam sealer continuously forms a longitudinal seam along lapped edges of the tube being formed. This longitudinal seam sealer can be used in machines having conventional cross sealing jaws as well as in machines in which the cross sealing jaws move in the direction of the moving film during the cross sealing operation. The heated longitudinal seam sealer includes a pair of sealer bars that include shaped confronting portions. The shaped confronting portions are heated and seal the lapped edges to form a seam. After exiting the shaped confronting portions the seam is engaged by a pair of pressure rollers that force the heated edges together to insure complete closure of the seam. The lapped edges of the film pass between the shaped confronting portions of the sealer bars which confine the lapped edges to a labyrinth cross section shape. The drive for the continuous movement cross sealing jaws include a pair of gear cases on opposite of the sealing jaws, each having two sets of spaced drive shafts. The drive shafts include cranks that impart rotary motion to a pair of link bases for the front and rear sealing jaw. Pairs of parallel links are pivotally connected at one end to the link bases and at the other end to the sealing jaws. The pivot connections of the parallel links include pressure or torsion members which bias the sealing jaws toward engagement.

31 Claims, 18 Drawing Sheets

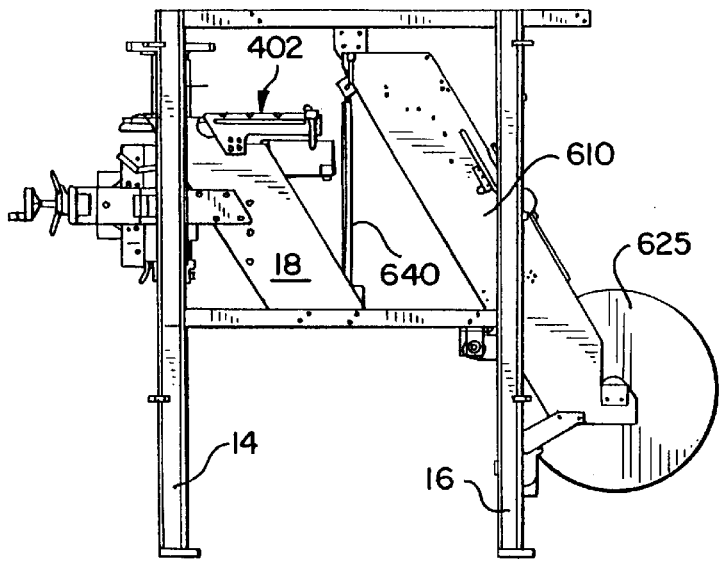
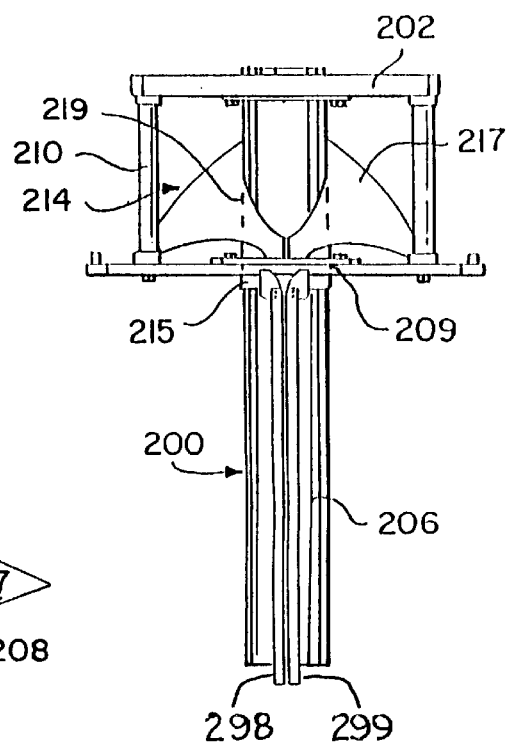
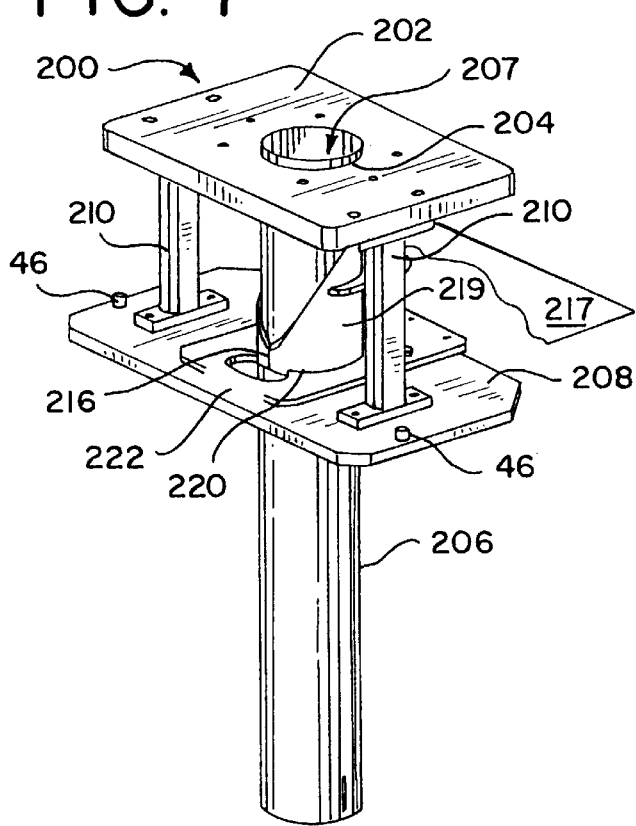

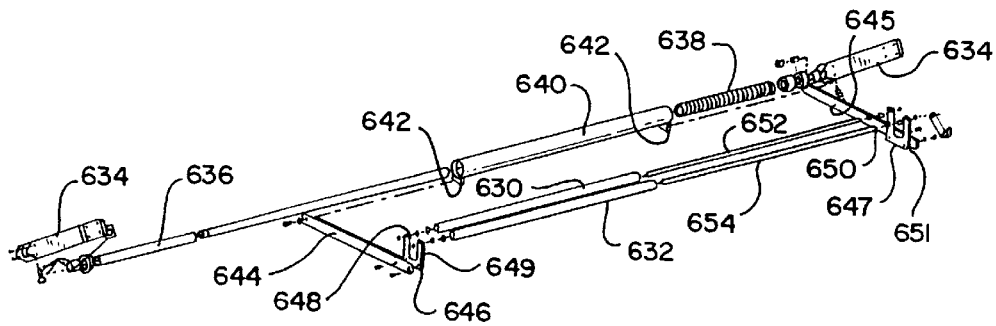
FIG. 23
FIG. 24
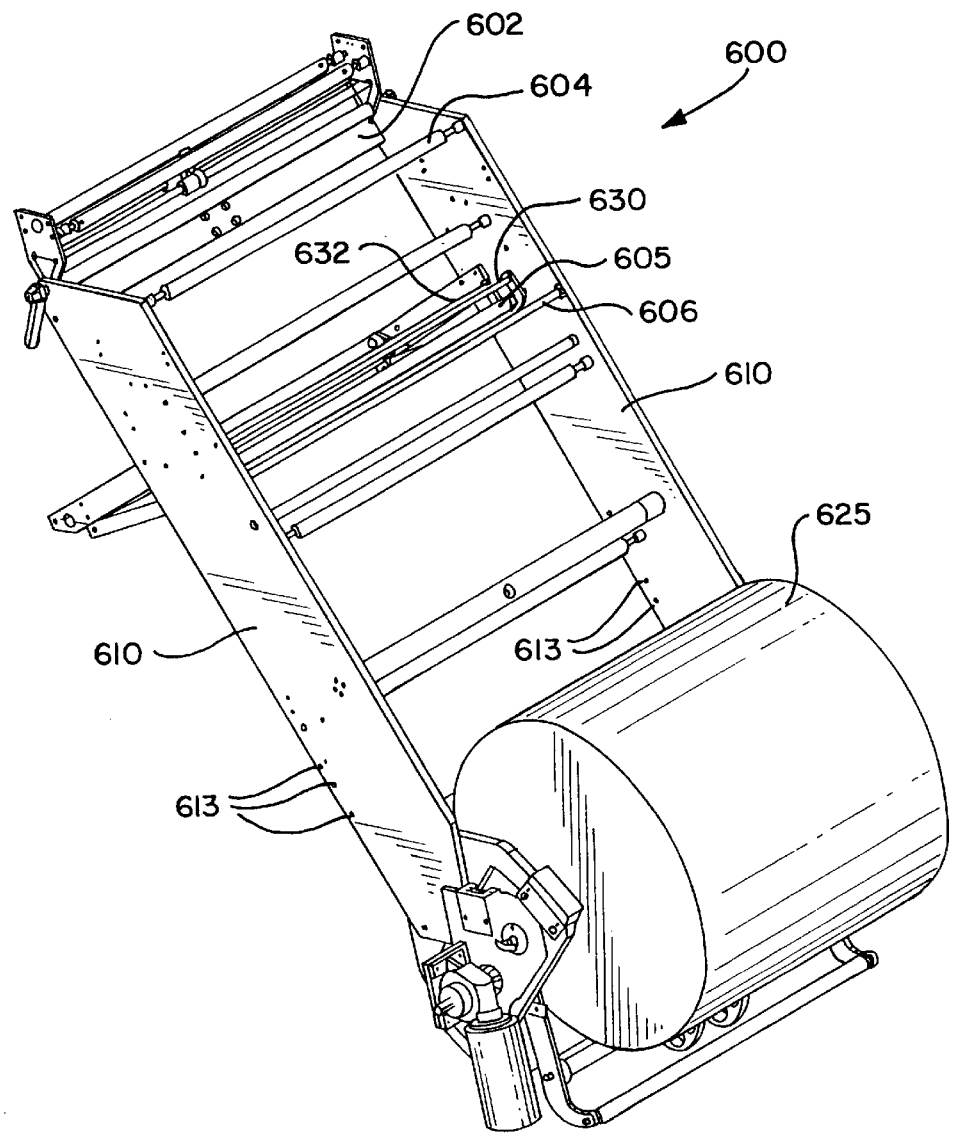

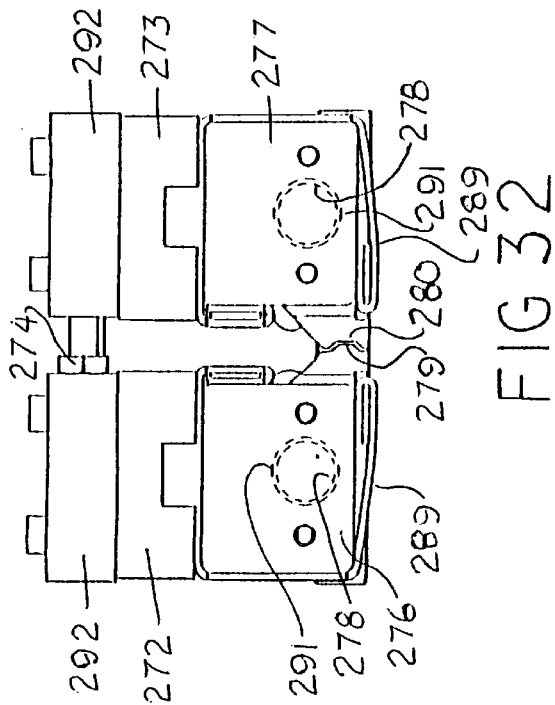
FIG 32
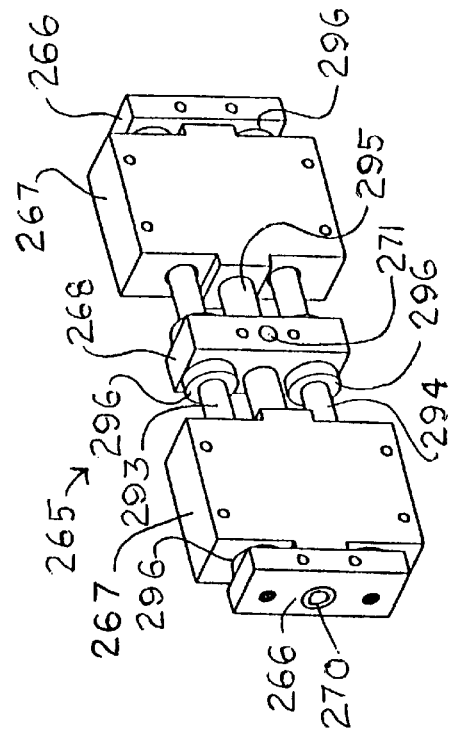
FIG 33
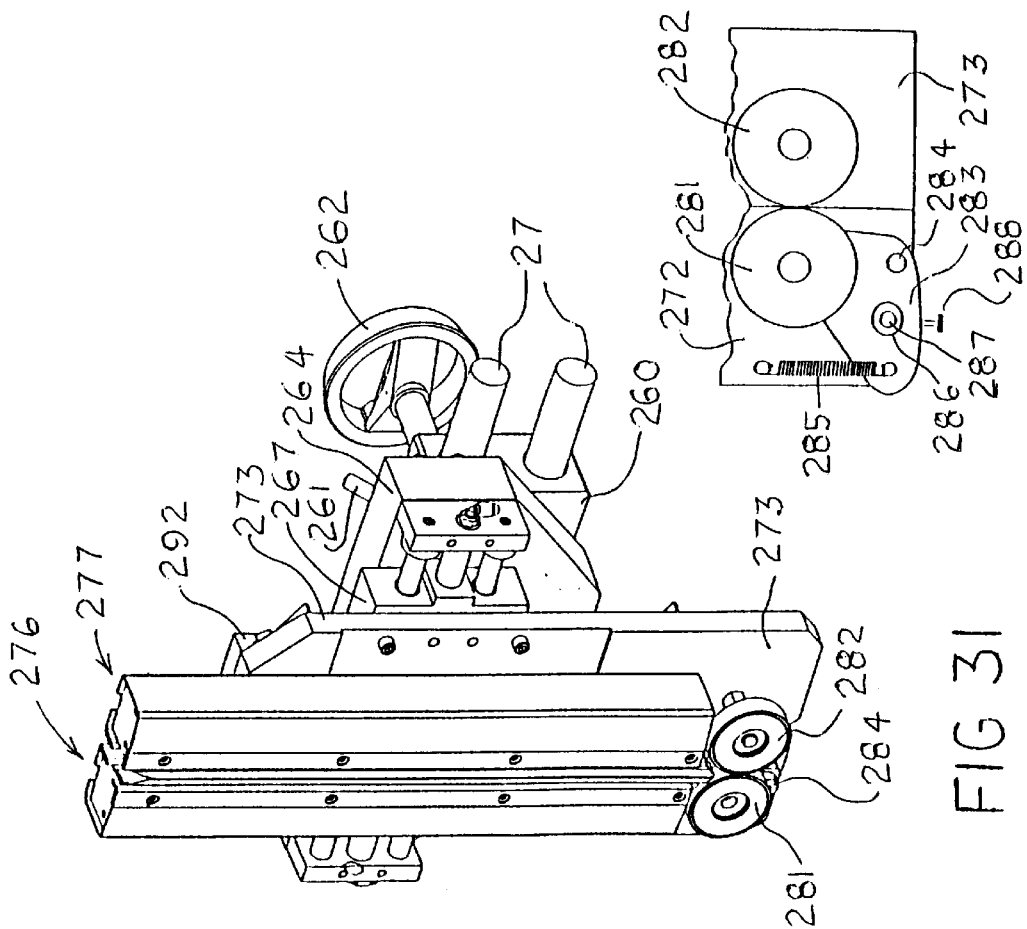
FIG 36
FIG 31

LONGITUDINAL SEAM SEALER FOR CONTINUOUS MOTION FORM, FILL AND SEAL MACHINE

This is a continuation-in-part of application Ser. No. 08/747,274, filed Nov. 13, 1996, now U.S. Pat. No. 5,752,370.

BACKGROUND OF THE INVENTION

This invention relates to a packaging apparatus and a method of forming packages. More specifically this invention relates to a form fill seal machine in which a longitudinal seam is being continuously formed. The cross sealing jaws can be of the type that move downwardly during the sealing operation and are synchronized with the film and the package being formed or of the type that do not move along the direction of the film feed.

The cross seal mechanism, that seals the top and bottom of each package produced on form-fill-seal packaging systems, is a critical component of such a system insofar as controlling the quality of the package. The cross seal mechanism must operate at a precise time in the package cycle and must complete its operation with precision and speed.

Reference is hereby made to U.S. Pat. No. 5,715,656, for a more complete disclosure of the form-fill-seal machine disclosed herein. The subject matter of U.S. Pat. No. 5,715,656 is hereby incorporated by reference as a part of this application.

The cross seal mechanism disclosed in the above identified U.S. Pat. No. 5,715,656, moves horizontally of the machine but does not move vertically. Thus, in that machine vertical movement of the tubular container must cease during the cross sealing operation, and then resume after the cross sealing operation is completed.

Current cross seal mechanism are complex and require constant monitoring and adjustment to assure the quality of the finished product. The intermittent or discontinuous movement of the film and the tubular package formed therefrom introduces problems in maintaining control over the film and complicates the film feeding mechanism and its controls. For these reasons there is a need for cross sealing mechanisms that perform the sealing and cutting operations while moving vertically in time with the vertical movement of the package being formed.

A form-fill-seal machine in which the cross sealing jaws move downwardly during the sealing operation is disclosed in the above identified application Ser. No. 08/747,274 now U.S. Pat. No. 5,752,370. In this patent the cross sealing jaws move in the direction of the moving film during the cross sealing operation. The drive for the cross sealing jaws includes a pair of gear cases on opposite sides of the sealing jaws, each having two sets of spaced drive shafts. The drive shafts include cranks that impart rotary motion to a pair of link bases for the front and rear sealing jaws. Pairs of parallel links are pivotally connected at one end to the link bases and at the other end to the sealing jaws. The pivot connections of the parallel links include pressure or torsion members which bias the sealing jaws toward engagement.

SUMMARY OF THE INVENTION

In accordance with the invention a form-fill-seal packaging machine has cross sealing jaws that move downwardly during the cross sealing operation. A web of flexible packaging material is guided from the supply roll to a forming shoulder which forms the flexible packaging material into a tube shape. The flexible packaging material can be a heat sealable sheet or a paper sheet having heat sealable coating along the areas where seals and seams are to be formed. The flexible packaging material flows from the forming shoulder to the forming tube. The product to be packaged is fed into the open upper end of the forming tube and then out its bottom into the tubular shaped package that is being formed. The tubular shaped material is continuously fed downward and the longitudinal edges of the flexible packaging material are continuously sealed as the material moves downwardly to form a longitudinal seam. The tubular shaped package is sealed at package length intervals, by cross sealing jaws that move downwardly in a continuous motion during the sealing operation, and cut into individual packages. In the embodiment of the invention disclosed herein vacuum belts, that are fixed relative to the forming tube, are used to pull the film downward along the forming tube.

There is a need for a form-fill-seal machine in which the continuous feed cross seal mechanism has a simple design, for which the speed and timing can be precisely controlled and easily changed to accommodate conditions and which provides reliable performance and the longitudinal sealing mechanism can accommodate changes in the vertical movement while producing a high quality seal.

The present invention provides a new continuous feed cross sealing mechanism for a form-fill-seal machine that includes a new and unique, durable rotary drive mechanism that has no moving jaw in respect to the mounting member, reciprocating parts or coil springs that functions in cooperation with a longitudinal sealing mechanism that produces a reliable seam as the film continuously advances.

This invention comprises a continuous feed cross feed mechanism in which the cross sealing jaws can be in engagement for up to 70% of their cycle and the drive mechanism will permit the rotary speed of the drive mechanism to be varied during the sealing portion of the cycle and provide maximum jaw closure time during which the longitudinal sealing mechanism is producing a continuous seam.

The invention can be retrofitted to existing machines or supplied as original equipment with new form-fill seal machines.

The invention further comprises gear cases located on both sides of the continuous moving sealing jaws that are driven by a microprocessor controlled servo motor and a longitudinal sealing mechanism that is in continuous engagement with the longitudinal edges of the film.

The invention further comprises a longitudinal seam sealer that confine the film edges to a confronting area but do not compress the film material into engagement. The longitudinal seam sealer is heated to a temperature that causes a seam to be formed yet permits the film to advance through the shaped confronting portions of the longitudinal sealer bars without placing a drag on the material while the material is being advanced.

The invention further includes a longitudinal seam sealer that includes sealer bars that create a longitudinal seam without placing a drag on the material and a set of pressure rollers that exert a compressive force on the longitudinal seam after it emerges from the sealer bars.

Still further the invention includes a longitudinal seam sealer that can be used with horizontal or vertical form fill and seal machines and with machines that have continuous movement cross sealing jaws or cross sealing jaws that to not advance in the direction of film feed.

While a number of control systems can be used in accordance with the present invention, the preferred control consists of a microprocessor control system that utilizes the Versa Module Europe (VME) standard card cage system. The VME system can use GS DOS, which is an industrial version of DOS, Windows and/or a number of standard software packages and components such as touch screens, modems and other hardware devices. This microprocessor control system provides the advantage of logically grouping by function the input/output screens that prompt the operator through start-ups, changes and adjustments. The operating system also enables the use of real-time statistics and diagnostics which permits the operator to perform weighing and cycle analyses.

BRIEF DESCRIPTION OF THE DRAWINGS

The drawings illustrate an embodiment of the invention in which:

FIG. 5 is a right side view of the form-fill-seal machine.

FIG. 6 is a front view of the change part mechanism.

FIG. 7 is an isolated perspective view of the change part mechanism as seen from the upper right.

FIG. 23 is an exploded perspective view of the dancer bar assembly.

FIG. 24 is an isolated perspective view of the film cage assembly.

FIG. 31 is an isolated perspective view of the longitudinal seam sealer and its mounting mechanism as seen from the back, upper, left.

FIG. 32 is a top view of the sealer bar and the base members upon which they are mounted.

FIG. 33 is a perspective view of the carriage slide mechanism.

FIG. 36 is a view from the rear of the pressure rollers, there mounting mechanism and a portion of the base member upon which they are mounted.

DETAILED DESCRIPTION OF THE PREFERRED EMBODIMENT

Figure 1:
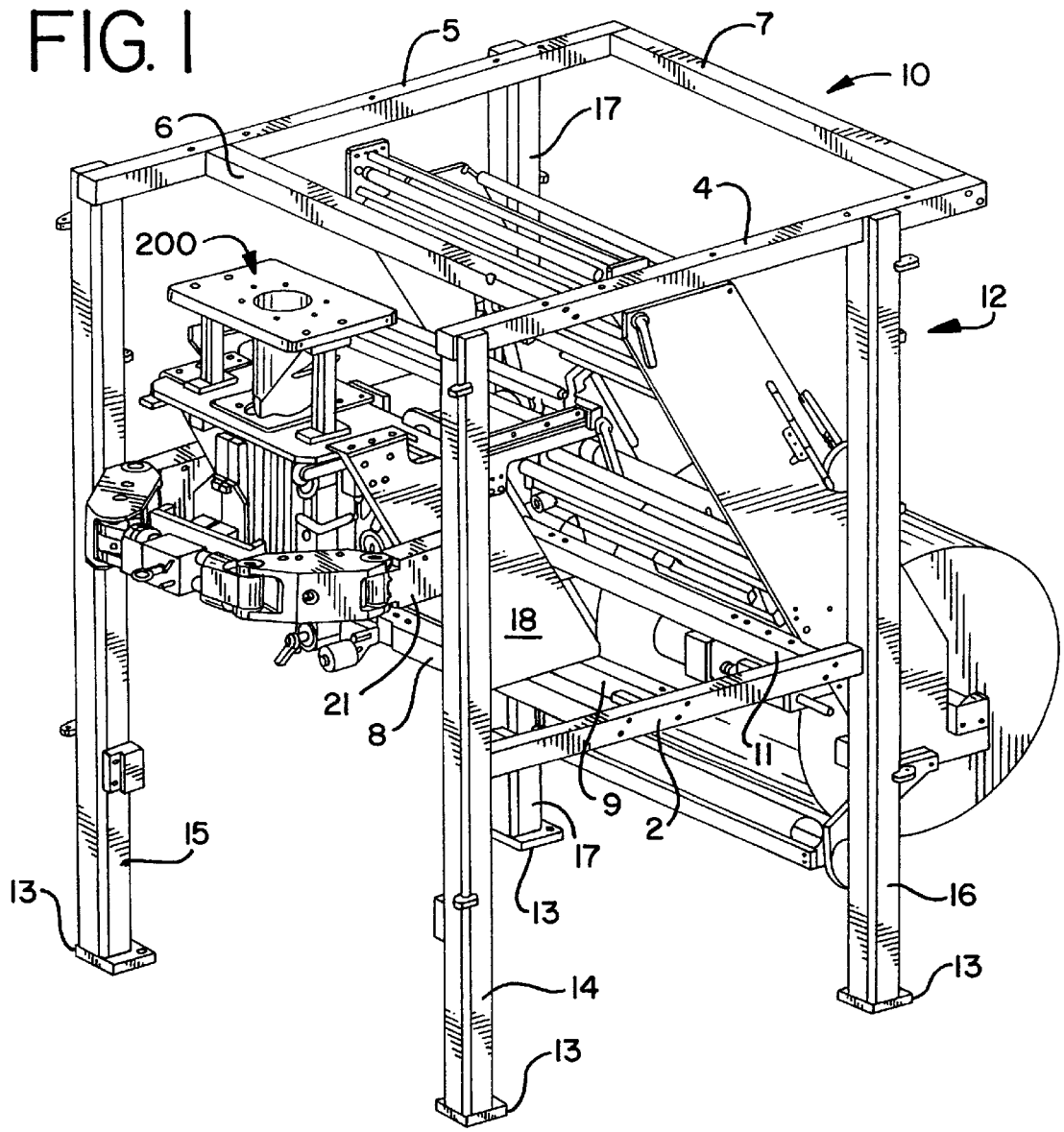
FIG. 1 is a perspective view of the form-fill-seal machine as seen from the front, upper, right.

FIG. 1 is a perspective view of the form-fill-seal machine 10 as seen from the front upper right. The sealing jaw mechanism 100, illustrated in greater detail FIGS. 12 through 20 is mounted on the machine as seen in FIG. 1.

The form-fill-seal machine 10 is built around a frame 12 that includes base plates 13 that rest upon the floor and support vertical columns 14–17. Vertical columns 14 and 16 are connected by a lower support member 2 and an upper support member 4. Vertical columns 15 and 17 are connected by a lower support member 3 and an upper support member 5. Support members 2–5 extend in the fore and aft direction of the form-fill-seal machine 10. The fore and aft extending upper support members 4 and 5 are connected by a forward support member 6 and a rearward support member 7. The fore and aft extending lower support members 2 and 3 are connected by a forward support member 8, a mid support member 9 and a rear support member 11. Right and a left parallelogram shaped plates, 18 and 19 (shown in FIGS. 8 and 9) respectively, are secured to and extend upward and forward from the forward support member 8 and the mid support member 9.

Figure 2:
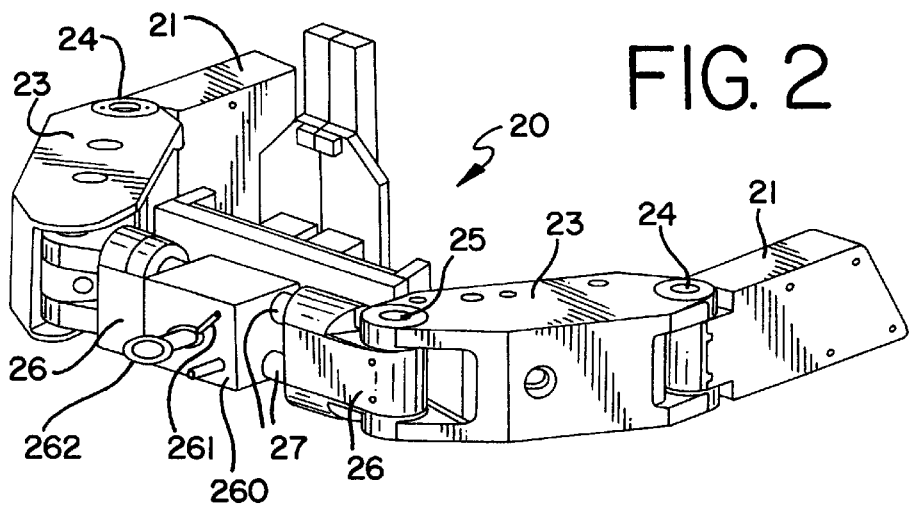
FIG. 2 is an isolated perspective view of the longitudinal seam sealer and its mounting mechanism as seen from the front, upper, right.

As further shown in FIG. 2, the longitudinal seam sealer 20 is supported by mounting members 21 that are secured to the outer surfaces of plates 18 and 19 by nuts and bolts. The mounting members 21 include vertical bores at their free ends through which link members 23 are pivotally connected about vertical pivots 24. The other ends of link members 23 are pivotally connected about vertical pivots 25 to mounting members 26. There are spring biased ball detents that hold the link members 23 and mounting members 26 in the relative positions shown in FIG. 1. The ball detents can be released upon the application of pressure to move mounting members 26 relative to the link members 23. The other ends of mounting members 26 each have a pair of vertically spaced rods 27 extending therefrom. The pairs of vertically spaced rods 27 extend into opposite sides of the central block 260 and can be reliably locked thereto. The longitudinal seam sealer 20 is carried by the central block 260 that is supported by rods 27 on mounting members 26. A screw mechanism 262 extends from the front of central block 260 that when screwed in and out adjust the in and out location of the longitudinal seam sealer 20. There is a rotating lock mechanisms 261 at the base of screw mechanism 262 that can be rotated to secure the screw mechanism 262 in a selected position.

If it is desired to replace the change parts assembly for one that will produce a different size package, the left mounting member 26 is released from the center block 260 which permits right link member 23 to be free to pivot about vertical pivots 24 and 25. This allows the entire longitudinal seam sealer 20 and its mounting mechanism to be pivoted out of their operative positions to an inoperative position outwardly of the right parallelogram shaped plate 18.

Figure 3:
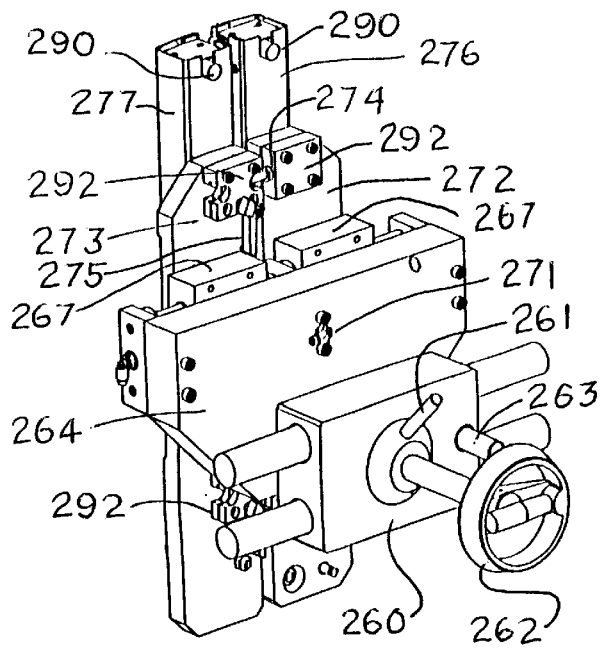
FIG. 3 is an isolated perspective view of the longitudinal seam sealer and its mounting mechanism as seen from the back, upper, left.

Referring now to FIGS. 3, 6 and 31–35 the preferred embodiment of the longitudinal seam sealer 20 will be discussed. FIG. 3 is an isolated view of the longitudinal seam sealer 20 and the center block 260 as they would be seen looking from the front left of the machine. FIG. 31 is also an isolated view of the longitudinal seam sealer 20 and the center block 260 but in this view they are seen looking from the back left of the machine. Portions of the carriage slide mechanism 265 is visible in FIGS. 3 and 30 and an unobstructed isolated view of the carriage slide mechanism 265 is shown in FIG. 33. The carriage slide mechanism 265 includes a pair of end plates 266 that are connected by a top slide bar 293, a bottom slide bar 294 and a hollow cylinder 295 that is located between the slide bars. A central member 268 is secured to the slide bars 293 and 294 and to the hollow cylinder 295 between the end plates 266. Silicone rubber bumpers 296 are provided on the top and bottom slide bars 293 and 294 adjacent the end plates 266 and central member 268. A pair of slide members 267 are mounted to slide on the slide bars 293 and 294 and on the hollow cylinder 295 such that the their motions is cushioned by the silicone rubber bumpers 296 at the extremes of their movements. Pressurized air can be fed to the carriage slide mechanism 265 through outer air inlets 270, secured in the end plates 266, and through central air inlet 271 secured to the central member 268. There is a magnetic piston carried in each side of the hollow cylinder 295. As pressurized air is fed to the carriage slide mechanism 265 through the central air inlet 271 the magnetic pistons are forced outwardly toward the end plates 266. The magnetic pistons are attracted to the adjacent slide member 267 and carry the slide member with them as they are moved by the pressurized air. Likewise when pressurized air is applied to the outer air inlets 270 the slide members 267 are caused to move inwardly toward the central member 268. It should be noted that central air inlet 271 can be best seen in FIG. 3. During sealing operation the slide members 267 must be adjacent to each other so that the shaped confronting portions 279 and 280 of the sealer bars 276 and 277 are adjacent to each other. When the sealing operation is stopped, even for short periods the slide members 267 must be moved apart from each other to avoid melting film that is between sealer bars 276 and 277. One of the slide members 267 is secured to right base member 272 and the other slide member 267 is secured to the left base member 273. Thus the right and left base members 272 and 273 are moved toward and away from each other by the slide members 267. The carriage slide mechanism 265 is secured to the back surface of mounting plate 264 through the end plates 266.

The right sealer bar 276 is carried by the right base member 272 and the left sealer bar 277 is carried by the left base member 273. Consequently, the right and left sealer bars 276 and 277 are moved toward and away from each other by the slide members 267 through the base members 272 and 273.

As best seen in FIG. 6, which is a front view of a change part assembly 200, a pair of film shields 298 ad 299 are mounted at their upper ends to the change part mounting mechanism. The film shields 298 and 299 hang down from their mounting and there is a gap between their inner edges. The shields 298 and 299 engage the outside surface of the film being formed into a tube and the lapped edges of the film extend through the gap. The film shields 298 and 299 are made from or coated with heat insulating material and thus function to prevent the tube portion of the film from being overheated.

Figure 34:
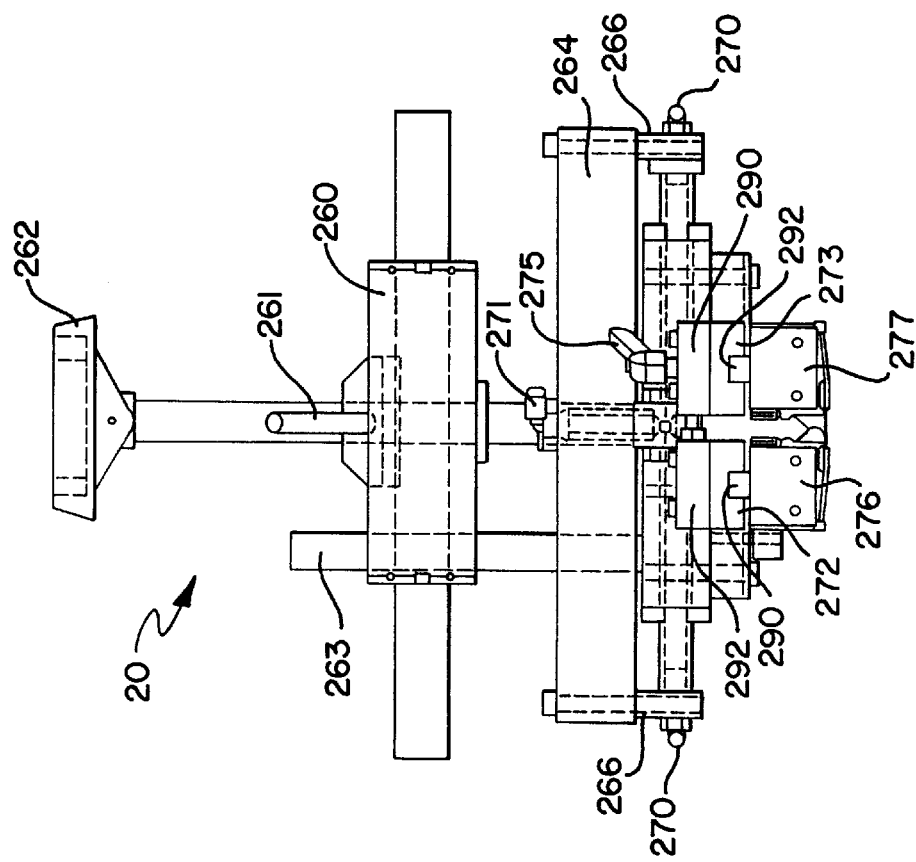
FIG. 34 is a top view of the longitudinal seam sealer and its mounting mechanism.

As can be best seen in FIGS. 3 and 34 restraining bar 263 is secured to mounting plate 264 and slides through a bore formed in center block 260. As the longitudinal seam sealer 20 is adjusted fore and aft by the screw mechanism 262, its attitude is maintained by the restraining bar 263.

FIG. 31 is an isolated view of the longitudinal seam sealer 20 as seem when looking from the forming tube 206 toward the front of the machine. As a result of looking from the back to the front the components seen on the left hand side of FIG. 31 are on the right hand side when looking from the front of the machine to the rear. Thus in discussing FIG. 31 the right sealer bar 276 appears on the left hand side and the left sealer bar 277 appears on the right hand side. The right 276 and left 277 sealer bar are formed from elongated metal bars. Each of the elongated metal bars has an elongated circular bore 291 formed therein that receives a tubular shaped cartridge 278 therein. Electrical power is supplied to the heater units cartridge 278 through wires 290. Power to the cartridge units is controlled by the microprocessor control system. The right sealer bar 276 is secured to the right base member 272 which is supported by a slide member 267. The left sealer bar 277 is secured to the left base member 273 which is supported by the other slide member 267.

FIG. 32 is an isolated top view of the sealer bars 276 and 277. The orientation of the right and left side components are reversed in this Figure for the reasons discussed above with respect to FIG. 31. The shaped confronting portion 279 of the right sealer bar 276, extends the entire length of the heater and has the cross section shape of a truncated right triangle. The shaped confronting portion 280 of the left sealer bar 277, extends the entire length of the heater and has the cross section shape that receive the truncated right triangle of the shaped confronting portion 279. The shaped confronting portions 279 and 280 complement each other in shape such that the portion 279 nestles within portion 280. This nestled relationship causes the films that pass through the gap formed between portions 279 and 280 to have a labyrinth cross section including four longitudinally extending creases. These longitudinally extending creases causes surface contact of the films even though they are not being physically pressed together while passing through the gap between portions 279 and 280. However, the nestled shaped confronting portions 279 and 280 do not engage each other.

Figure 35:
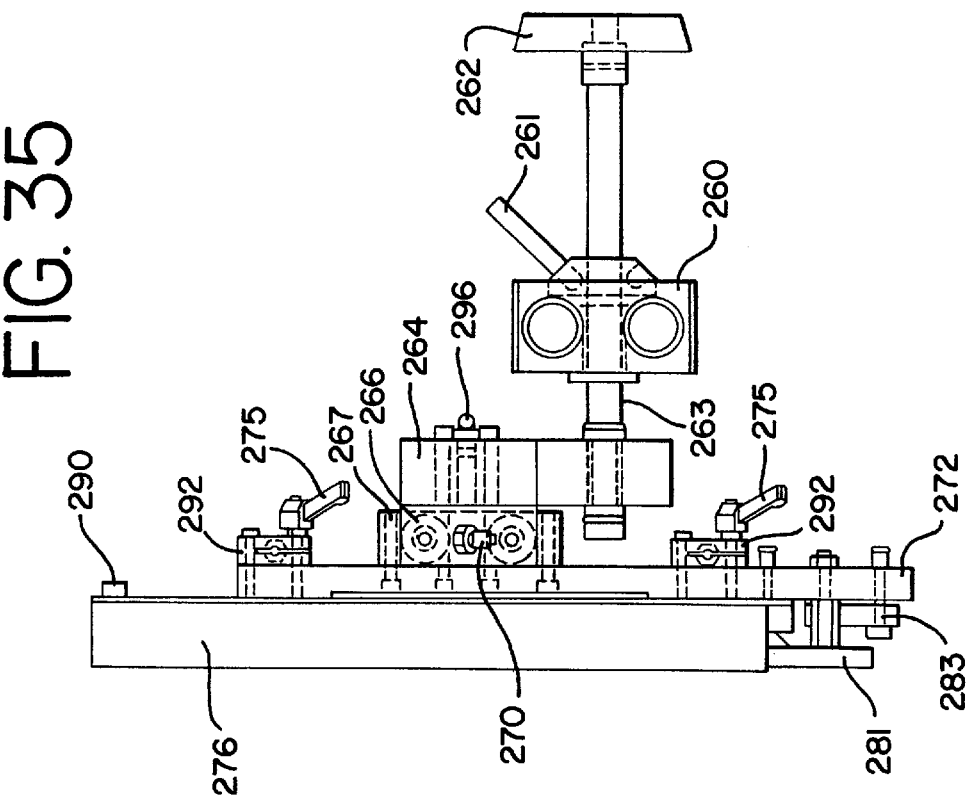
FIG. 35 is a side view of the longitudinal seam sealer and its mounting mechanism.

If they were permitted to engage they would create a drag on the film that is threaded through these portions which is unacceptable. Although the film between portions 279 and 280 is confined to a labyrinth shape for its duration between the portions 279 and 280 the labyrinth shape is not always maintained after the film exits from between portions 279 and 280. Thus, as seen in FIG. 32, there is a gap between the shaped confronting portions 279 and 280 that is greater than the thickness of the two layers of film that is threaded between these portions. Furthermore since the machine must be capable of operating with film of different thickness this gap is adjustable. As is best seen in FIGS. 3 and 32 stop blocks 292 are secured to the upper and lower portions of right and left base members 272 and 273. A stop bolt 274 is threaded in one of the stop blocks 292 of each set, and can be locked in its adjusted position by a stop lock lever 275. The head of the stop bolts 274 engage the other stop block 292 in the set to thus maintain the necessary gap between the shaped confronting portions 279 and 280. During operation, the lateral edges of the bag making film are fed to the top of the forming tube 206 and between the shaped confronting portions 279 and 280 of the right and left sealer bars 276 and 277. The temperature of the shaped confronting portions 279 and 280 is elevated by the cartridges 278. The gap between the shaped confronting portions 279 and 280 is set such that there is no pressure exerted on the film edges passing between portions 279 and 280 and thus no drag is created by the longitudinal seam sealer 20. It should be noted that although the embodiment that has been illustrated and described discloses shaped confronting portions 279 and 280 that are nestled within each other and confine the film passing there between to a labyrinth cross section shape, it is also contemplated by this invention that the shaped confronting portions could be flat. In an embodiment in which the shaped confronting portions are flat the film that passes therebetween is not confined to a labyrinth shape. The heat radiating from the shaped confronting portions 279 and 280 is sufficient to melt the film sufficiently that a bond is created between the engaging film surfaces. However, since the edges are not being pressed together while passing through the sealer bars 276 and 277 there will be portions of adjacent surfaces that are not engaged and thus these unengaged surfaces may not become bonded together. Furthermore, since the surfaces are not being pressed together while passing through the sealer bars 276 and 277 a set of pressure rollers 281 and 282 are provide immediately below the sealer bars 276 and 277. The pressure rollers 281 and 282 apply pressure to the seam and insure maximum bonding strength. As best seen in FIG. 31 left pressure roller 282 is mounted for rotation on the left base member 273. Right pressure roller 281 is mounted for rotation on pivot member 283 which is mounted at pivot 284 on the right base member 272. Pivot member 283 is biased by spring 285 to rotate in the clockwise direction, as seen in FIG. 35, about pivot 284. An aperture 286 is formed in pivot member 283 through which a stop 287, that is secured in right base member 272, extends. An adjusting screw 288 is treaded through the edge of pivot member 283 such that its free end extends into the aperture 286 where it can engage stop 287. Adjusting screw is adjusted such that the edges of right and left pressure rollers 281 and 282 would not engage if there was no film edge between them but are close enough that pressure rollers 281 and 282 function to insure maximum bonding strength in the longitudinal seam.

As is best seen in FIGS. 31 and 32 each of the sealer bars 276 and 277 are wrapped in insulating covers 289 that extend over the entire length of heaters. The insulating covers 289 not only conserve power but protect the surrounding machine components from exposure to heat and render the machine safer for thus people working on and around it. The insulating covers 289 may also cover the shaped confronting portions 279 and 280 of the sealer bars 276 and 277.

Standard form-fill-seal machines are adaptable to produce packages of various shapes and sizes by changing the forming tube and forming shoulder. The forming shoulder and tube assembly must however be mounted relative to other components of the machine with precision to ensure proper operation. Changing a form-fill-seal machine from one size package to another is, in the conventional machine, a time consuming task that requires a highly skilled machine operator. During the change over, the machine is of course not operating and thus the production from the machine is lost. An aspect of this invention is to provide a change part assembly 200 that can be removed quickly and easily and replaced when it is desired to change the package size being run on the form-fill-seal machine.

Figure 4:
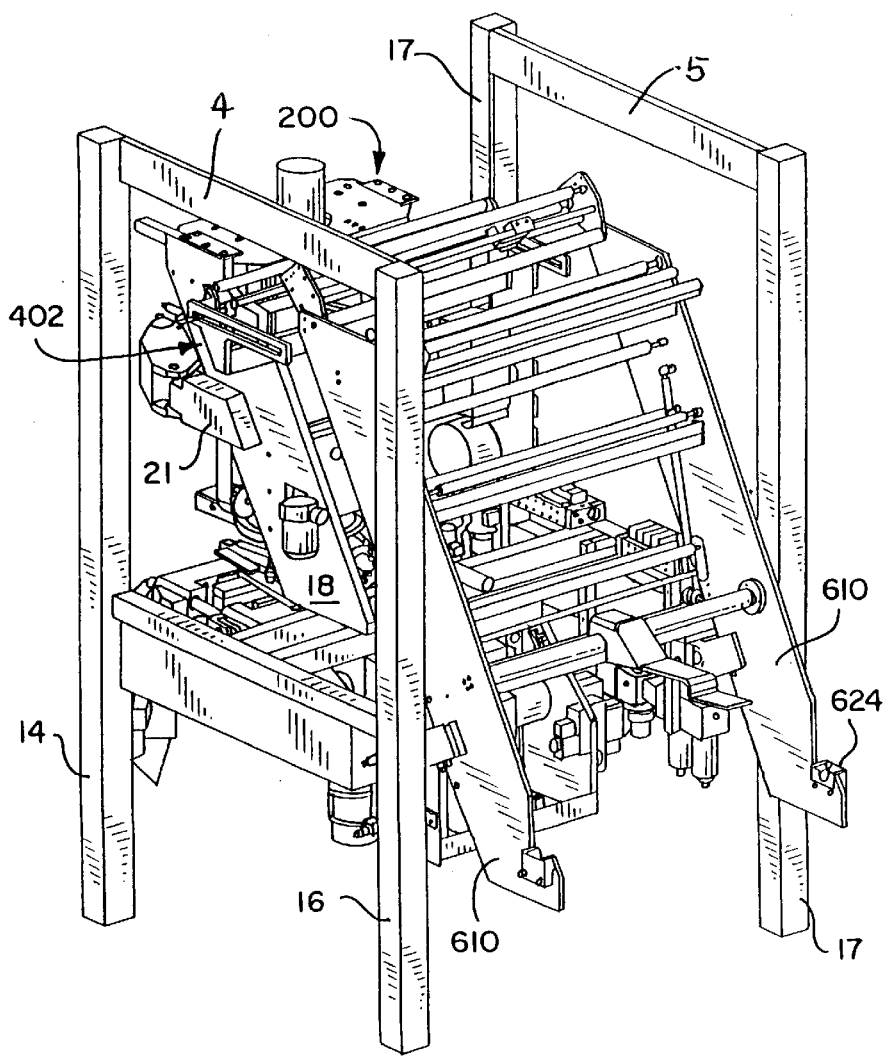
FIG. 4 is a perspective view of the form-fill-seal machine as seen from the front upper left.

The change part assembly 200 is seen mounted on the machine in FIGS. 1 and 4 and isolated in FIGS. 6 and 7. The change part assembly 200 includes a forming tube mounting plate 202 that has a faceted opening 204 formed therein. The forming tube 206 is secured to the forming tube mounting plate 202 within the faceted opening 204. The product to be sealed in the bags is loaded through the open end 207 of the forming tube 206. For a more detailed disclosure of a forming tube having a plurality of longitudinally extending flat surfaces, of the type disclosed herein, reference may be had to U.S. Pat. No. 5,255,497, which patent is hereby included by reference as a part of this disclosure. A lower plate 208 is connected to forming tube mounting plate 202 by a pair of columns 210. Lower plate 208 has an aperture 209 (see FIG. 6) formed therein that is larger than the forming tube 206. The forming shoulder 214 is constructed by welding the shoulder portion 217 (see FIG. 6) to the collar shaped body portion 219 (see FIGS. 1, 4, 6 and 7). The shoulder portion 217 is not included in FIGS. 1 and 4, to more clearly show the surrounding components, and in FIG. 7 only the back edge portion is illustrated. The forming shoulder 214 surrounds the forming tube and is spaced therefrom a sufficient distance to permit the film from which the package is formed to freely pass between the outer surface of the forming tube and the inner surface of the forming shoulder 214. The upper edge of the forming shoulder 214 dips down forming a V-shaped depression that converges to a vertical slot 216. The forming shoulder 214 is secured to a shoulder plate 218 that has a circular aperture 220 formed therein. An oval shaped aperture 222 is formed in the shoulder plate 218 adjacent the vertical slot 216. The shoulder plate 218 is secured to the lower plate 208. As is well known in the art, the film from which the package is formed is fed to the forming tube 206 from the film roll 625 that is located at the back of the form-feed-seal machine 10 as a flat sheet and is formed into a tubular shape by the forming shoulder 214. The open edges of the tubular shaped film extends through the vertically extending slot 216 and are sealed by the longitudinal seam sealer 20.

As best seen in FIG. 6 the bottom rim portion 215 of forming shoulder 214 extends below lower plate 208. The change part mounting mechanism includes aligning grooves and pins that insure the precise mounting of the change part 200 on the machine relative to the right 302 and left 303 vacuum drive belt assemblies. Numerous change part assemblies 200, of different shapes and sizes, can be mounted on the machine. However, the gap between the forming shoulder 214 and the forming tube 206 is consistent and the ratio of the outer dimension of the forming shoulder 214 and the forming tube 206 is consistent. Thus, the bottom rim portion 215 of each change part 200 includes reference surfaces that establishes a reference for that particular change part for a purpose to be further discussed.

Figure 8:
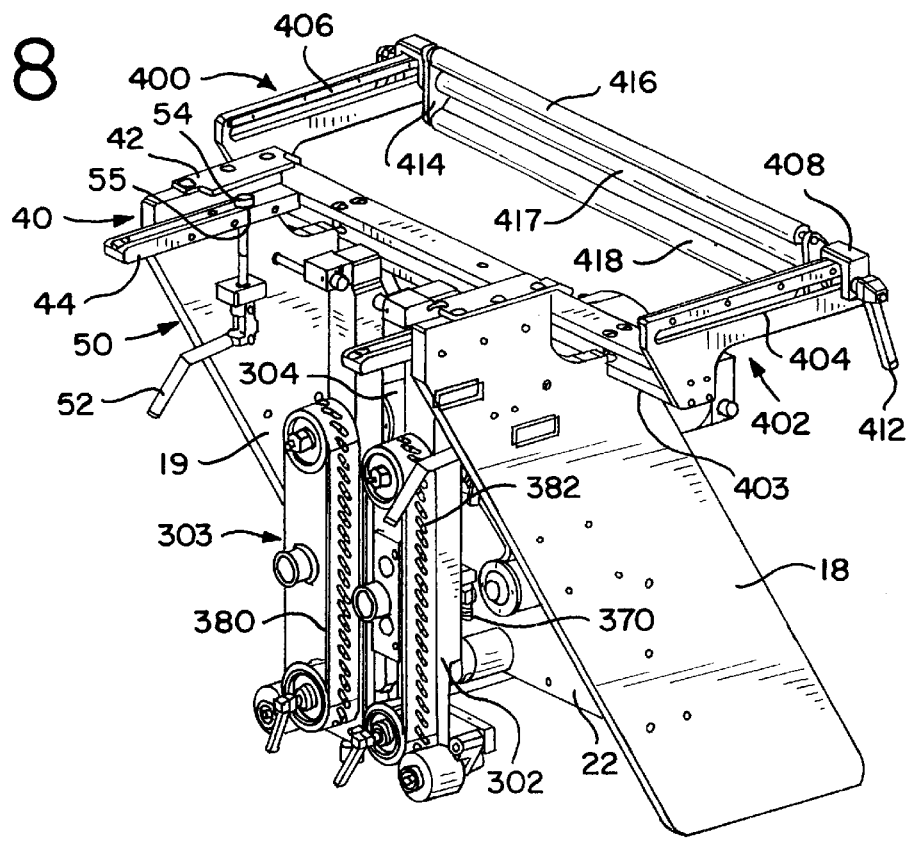
FIG. 8 is an isolated perspective view of the vacuum pull belt arrangement as seen from the front upper right.

Referring now to FIGS. 6, 7 and 8 the mounting of a change part assembly 200 on the machine will be discussed. The lower plate 208 of the change part assembly 200 is slid into slots 40 that are defined by the parallelogram shaped plates 18 and 19, upper plates 42 secured to the upper edge of plates 18 and 19 and bars 44 that are secured to the inner surfaces of the plates 18 and 19. The lower plate 208 has an upwardly projecting stud 46 on each edge that will slide into the slots 40. The upper plates 42 have notches 48 formed in their leading edges that are dimensioned to receive the studs 46. Toggle lock mechanisms 50, including handles 52 are mounted on the inner surface of each parallelogram shaped plates 18 and 19 below the bars 44. The toggle lock mechanisms 50 include a rod 54 having a flat end that extends through cylindrical openings 55 formed in the bars 44. After, the edges of bottom plate 208 are slid into slots 40 to the point where studs 46 are engaged in the notches 48, the handles 52 are moved to the locked position which causes rods 54 to extend upwardly through cylindrical openings 55 and secure the change part assembly 200 in place in the grooves 40. All components of this mounting arrangement are machined to precision and, as a result, the change part assembly 200 can be quickly and easily mounted on the machine in the correct position. This mounting arrangement provides a mounting mechanism that has a level of precision that permits a change part assembly 200 to be slid into the slots 40 and secured in place by the toggle lock mechanisms 50, and no further adjustment is required. This is a result of not only the precision machining of all mounting components but also the fact that the change part assembly 200 is mounted at a location that is very close to the film belt drive assembly 300 and there are very few parts between the precision mount and the forming tube 206. In the prior art, the mounting members for the change part assemblies can not be relied upon to be consistently located. This is a result of their being supported through a series of connected parts, each of which has a manufacturing tolerance. As a result, the change part assemblies must be carefully adjusted and leveled with shims and the like. The mounting arrangement disclosed herein eliminates such steps by mounting the change part very close to the pull belts, greatly reducing the number of pieces therebetween. Furthermore, all engaging components of the change part mounting arrangement are precision machined surfaces. The range of variability has been greatly reduced and the interchangeability of the change parts has been greatly enhanced.

Figure 9:
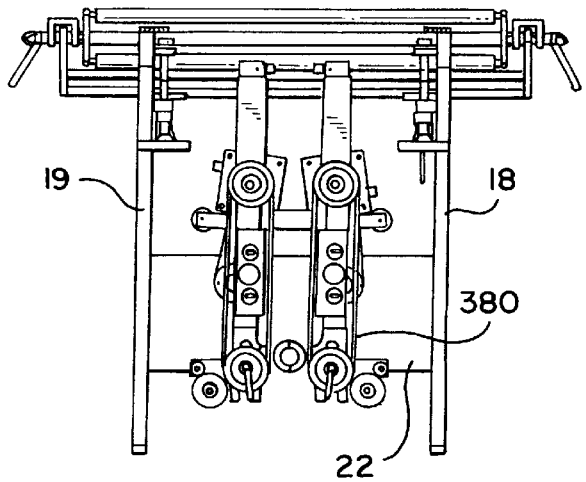
FIG. 9 is a front view of the vacuum pull belt arrangement that is seen in FIG. 8.
Figure 10:
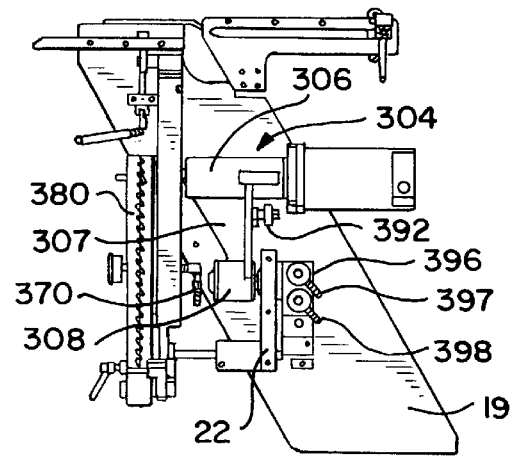
FIG. 10 is a side view showing the vacuum pull belt arrangement seen in FIG. 8.
Figure 11:
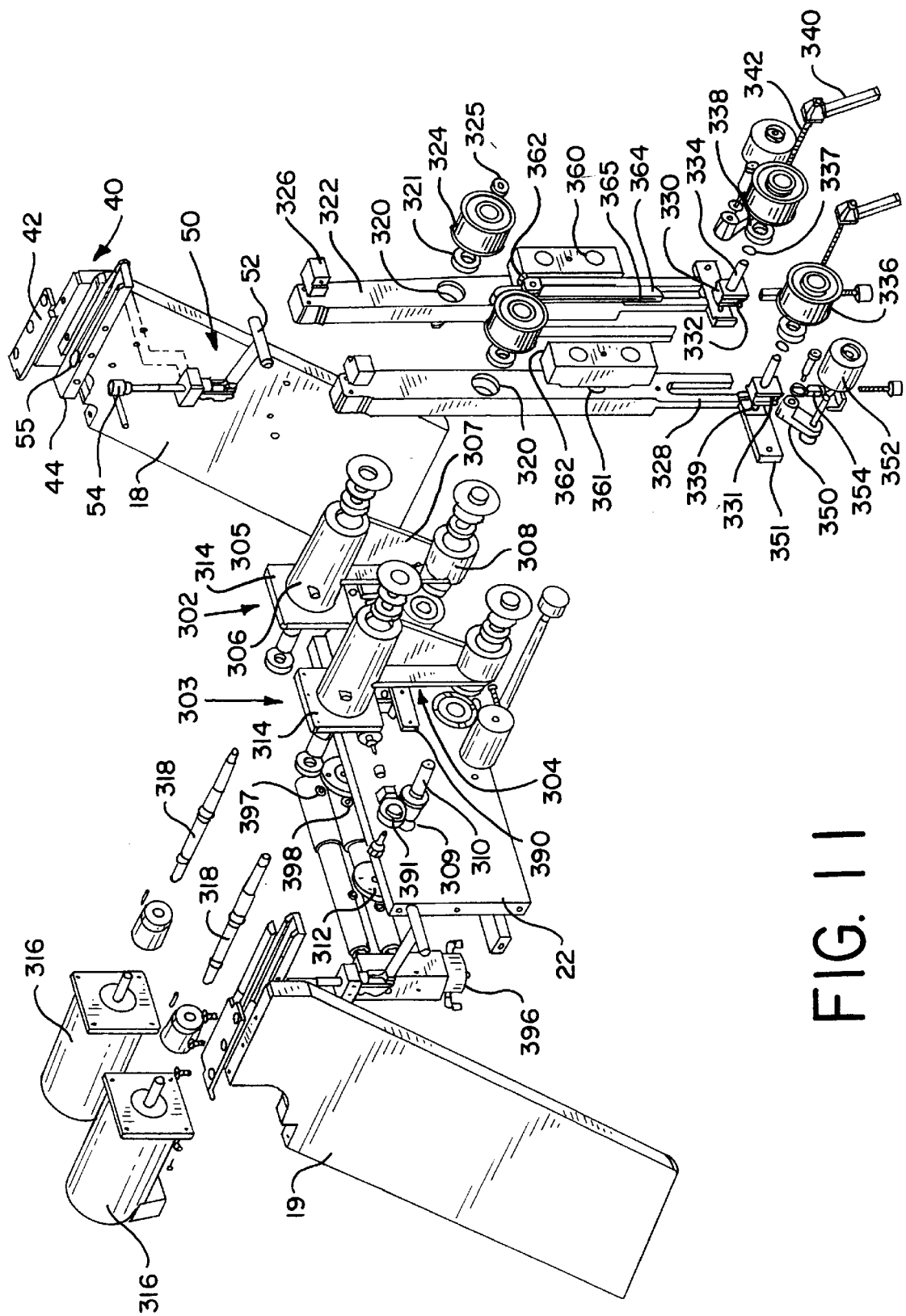
FIG. 11 is an exploded view of the film belt drive assembly.

As best seen in FIGS. 9, 10 and 11 a frame member 22, that lies in a vertically extending plane, is connected at its ends to the parallelogram shaped plates 18 and 19. The film belt drive assembly 300 is mounted on frame member 22. The film belt drive assembly 300 consists of a right 302 and a left 303 vacuum drive belt assembly. The right 302 and left 303 vacuum drive belt assemblies are virtual mirror images of each other and thus they will be described only once. The reference numbers for the various parts of the vacuum drive belts are divided between the right and the left assemblies to avoid crowding.

The vacuum drive belt assemblies 302, 303 will be described with reference to FIGS. 7–11. Each vacuum drive belt unit comprises a casting or mounting member 304 having an upper cylindrical member 306 and a lower cylindrical member 308 that are interconnected by an arm 305 that is reinforced by a web 307. The casting 304 is pivotally mounted on the vertical frame member 22 about lower cylindrical member 308. This mounting includes a shaft 310 that extends through an aperture 309 that is formed in frame member 22. The shaft 310 is secured to the back surface of vertical frame member 22 by a retainer flange 312. The rear end of upper cylindrical member 306 carries a shoulder plate 314 to which is secured a stepper motor 316. The stepper motors 316 drives the film drive shaft 318 that extends through the upper cylindrical member 306. The drive shafts 318 extends through openings 320 formed in the pulley supports 322 and the pulley drives 324 are secured at their free ends by lock nuts 325.

A biasing device is provided between the right 302 and left 303 vacuum drive belt assemblies for causing these assemblies to move relative to each other. This biasing device includes mounting arms 390 that are secured to the arms 305 of the vacuum drive belt assemblies 302, 303 and an air cylinder 392. The rod end 391 of air cylinder 392 is connected to mounting arm 390 of vacuum drive belt assembly 303 and the head end of cylinder 392 is connected to the mounting arm 390 of vacuum drive belt assembly 302. When cylinder 392 is expanded or retracted, the castings 304 are caused to pivot about lower cylindrical member 308. When cylinder 392 is expanded, the distance between the pulley supports 322 increases and when the cylinder 392 is retracted the distance between the pulley supports 322 decreases.

While setting the machine up for a different size package and during normal operation of the machine, cylinder 392 is biased in the direction to retract and thus cause the pulley supports 322 to move toward each other. After a change part assembly 200 has been mounted and secured in place, the cylinder 392 is retracted, causing the pulley supports 322 to move toward each other. As the pulley supports 322 move toward each other the pull stops 326 approach the bottom rim portion 215 of forming shoulder 214. When the pull stops 326 engage the reference surfaces of the rim portion 215 of forming shoulder 214, the movement of the upper ends of pulley supports 322 stop. However, the lower ends of pulley supports 322 are still free to move. The pulley supports pivot about the engagement point of the pull stops 326 with the bottom rim portion 215 of the forming shoulder 214. This movement is stopped when the portions of continuous belts 380 that are overlaying the driven pulleys 336 make contact with the lower portion of the forming tube 206. The pull stops 326 and the bottom rim portion 215 of the forming shoulder 214 are formed with precision to insure that the surface of the continuous belts 380 are spaced from the surface of the forming tube 206 a distance of 0.02 of an inch at the pulley drives 324. Thus, there is a gap at the leading edge of the continuous belts 380 relative to the forming tube 206. A precession adjustment is built into the pull stops 326 to achieve more precise spacing, if required. This 0.02 of an inch spacing of the continuous belts 380 from the forming tube enables the film to be held against the continuous belts 380 by vacuum and out of engagement with the forming tube. This eliminates frictional drag between the forming tube 206 and the film. In the prior art, vacuum pull belts were mounted on housings that were slid back and forth on shafts. Accurate stop mechanisms were required to secure the pull belts such that there was a very small gap between the surface of the pull belts and the forming tube. Accomplishing this adjustment is a very tedious and time consuming task. Although in applicant's device there is line contact of the continuous belts 380 with the forming tube 206 along the driven pulleys 336, this contact results in minimal frictional drag and can be tolerated. As a result of this arrangement an unlimited number of change parts, of different shapes and sizes, can be used on a machine and the vacuum belt assemblies 302 and 303 will always be in proper adjustment because the proper adjustment is built into the change part itself.

The opening 320 carries a bearing 321 through which drive shaft 318 extends. The pulley support 322 extends upwardly from opening 320 and has pull stop 326 secured to its upper free end. The pulley support 322 also extends downwardly from opening 320 and terminates in a two-pronged fork 328. The prongs of the two pronged fork have square cross sections. An idler guide mount 330 having a pair of vertically extending grooves 331 and 332 formed therein and a pivot shaft 334 extending therefrom. The groves 331 and 332 of idler guide mount 330 receive the prongs 328 and provide a guide for vertical sliding of the idler guide mount 330. The driven pulley 336 is rotatably carried by pivot shaft 334 on idler bushing 337 and bearing 338. An adjusting handle 340 having a threaded shaft 342 extending therefrom extends through the driven pulley 336 and the pivot shaft 334 and is threaded into a threaded opening 339 formed in an idler mounting arm 342. The adjusting handle 340 can be loosened and then tightened when it is desired to adjust the position of the idler guide mount 330 on the prongs 328. The rear surface of the idler guide mount extends into a vertical groove formed in the idler mounting arm which allows the front surface of the idler mounting arm to engage the rear surfaces of forks 328 to fictionally secure the idler guide mount 330 in a selected location.

A brush mounting arm 350 is pivotally mounted at the free end of the idler mounting arm 351 and carries a pivotally mounted brush 352 at its free end.

A tension adapter 354 having a square cross section is provided for adjusting the tension in the pull belts 380. A threaded shaft having a thumb screw head is provided that permits manual adjustment of the tension adapted 354. The tension adapted 354 has a built in clutch that functions to limit the maximum amount of tension that can be applied to the pull belts 380.

Film drive mounting nozzles 360 are secured to the pulley supports 322 over openings 361 that are located between the openings 320 and the two pronged forks 328. A vertically extending slot 362 is formed in the vertical side of drive mounting nozzles 360 that faces the other vacuum feed drive assembly 302 or 303. A film drive nozzle 364 is secured in vertically extending slot 362. The film drive nozzle 364 has a vertically extending slotted opening 365 formed in its outer surface. There is an opening (not shown) in the rear surface of film drive mounting nozzle 360, aligned with opening 361, that communicates with a chamber (not shown) formed in film drive mounting nozzle 360. The chamber communicates with a slotted opening formed in the base of slot 362. The slotted opening formed in the base of slot 362 communicates with an opening or openings formed in the base of film drive nozzle 364. A vacuum fitting 370, see FIG. 10, extends through opening 361 and is secured in the aligned opening formed in the film drive mounting nozzle 360, such that when a vacuum hose is connected to vacuum fitting 370 a vacuum is created along the vertically extending slotted opening 365.

A continuous belt 380, see FIG. 8, having a series of diagonal slots 382 formed therein along its entire length, is mounted over the pulley drive 324 and the driven pulley 336. The continuous belt 380 passes over the vertically extending slotted opening 365 formed in film drive nozzle 364. During the time that a diagonal slot 382 is moving along the vertically extending slotted opening 365 there is a vacuum on the outer surface of the continuous belt adjacent this particular diagonal slot 382. As will be further discussed, the film from which the package is being formed is located adjacent the continuous belt 380 and the vacuum appearing through the diagonal slots 382 holds the film against the continuous belt 380 and moves the film downwardly along with continuous belt 380.

As is best seen in FIGS. 10 and 11, a vacuum generator assembly 396, that is mounted on the rear surface of vertically extending frame member 22, includes vacuum outlets 397 and 398 that are connected by hoses to the vacuum fittings 370 carried by the vacuum drive belt assemblies 302, 303.

Figure 21:
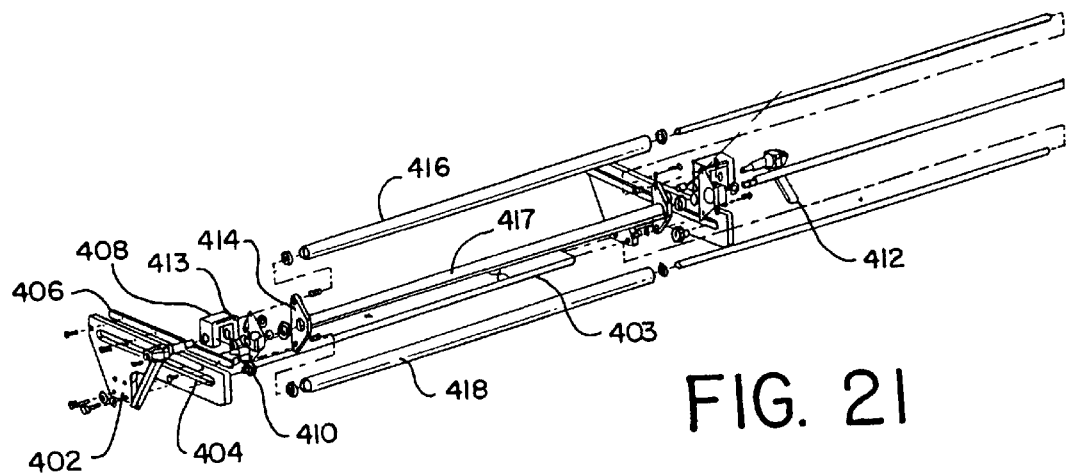
FIG. 21 is an exploded perspective view of the tension roller assembly.

The tension roller assembly 400 is shown in FIG. 8 mounted on the upper rear edges of the parallelogram shaped plates 18 and 19 and as an exploded view in FIG. 21. The assembly 400 functions to control the tension in, and take slack out of, the film immediately before it reaches the forming shoulder 214. It is important that the film lies flat on the surface of the forming shoulder 214 and there are no air bubbles between the film and the surface of the forming shoulder 214. The assembly 400 includes rearwardly extending horizontal brackets 402 on each side that are connected by a tie bar 403. Brackets 402 have horizontal slots 404 formed therein and gear racks 406 secured to the brackets 402 along the upper edges of the slots. A roller frame clamp 408 is slidable along the upper edge of the brackets 402. A spur gear 410 is supported on each roller frame clamp 408 that meshes with its corresponding gear rack 406. The gear racks 406 and meshing spur gears 410 cause the roller frame clamp 408 to move in unison along the brackets 402. A handle 412, that is connected to a tension retainer mechanism 413 is provided for each of the roller frame clamps 408. Handles 412 can be turned to secure or release the roller frame clamp 408 at selected locations along the brackets 402. Triangular shaped plates 414 are connected by a pivot shaft or torque tube 417. The pivot shaft or torque tube 417 is carried by the roller frame clamp 408 and can be pivoted relative thereto and secured in a selected adjusted position by handles 412. A pair of horizontally extending rollers 416 and 418 are carried by the triangular shaped plates 414. The film extending from the rear of the machine over the top roller 416 and then extends back and under the lower roller 418 from which it extends to the back edge of the shoulder portion 217 (see FIG. 7) of the forming shoulder 214. The roller frame clamps 408 and triangular shaped plates 414 are adjusted such that the film that extends from the lower roller 418 to the lower edge of the shoulder 214 has a slight negative angle with the surface of the shoulder 214 which causes the film to maintain contact with the shoulder and eliminate wrinkles in the film. The roller frame clamp 408 can be adjusted along the brackets 402 and secured at a location at which the lower rod 418 is properly located relative to the forming shoulder 214 to insure that there is no slack in the film as it encounters the forming shoulder 214 and there are no air bubbles between the film and the surface of the forming shoulder 214.

Figure 17:
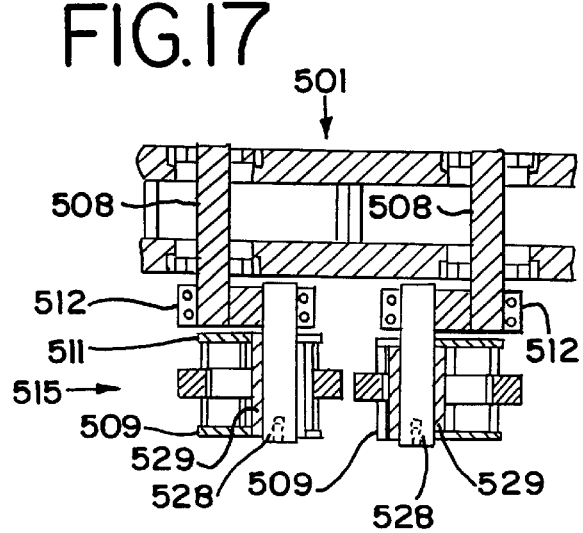
FIG. 17 is a cross section view of a portion of the sealing jaw mechanism taken along lines 17—17 of FIG. 15.
Figure 18:
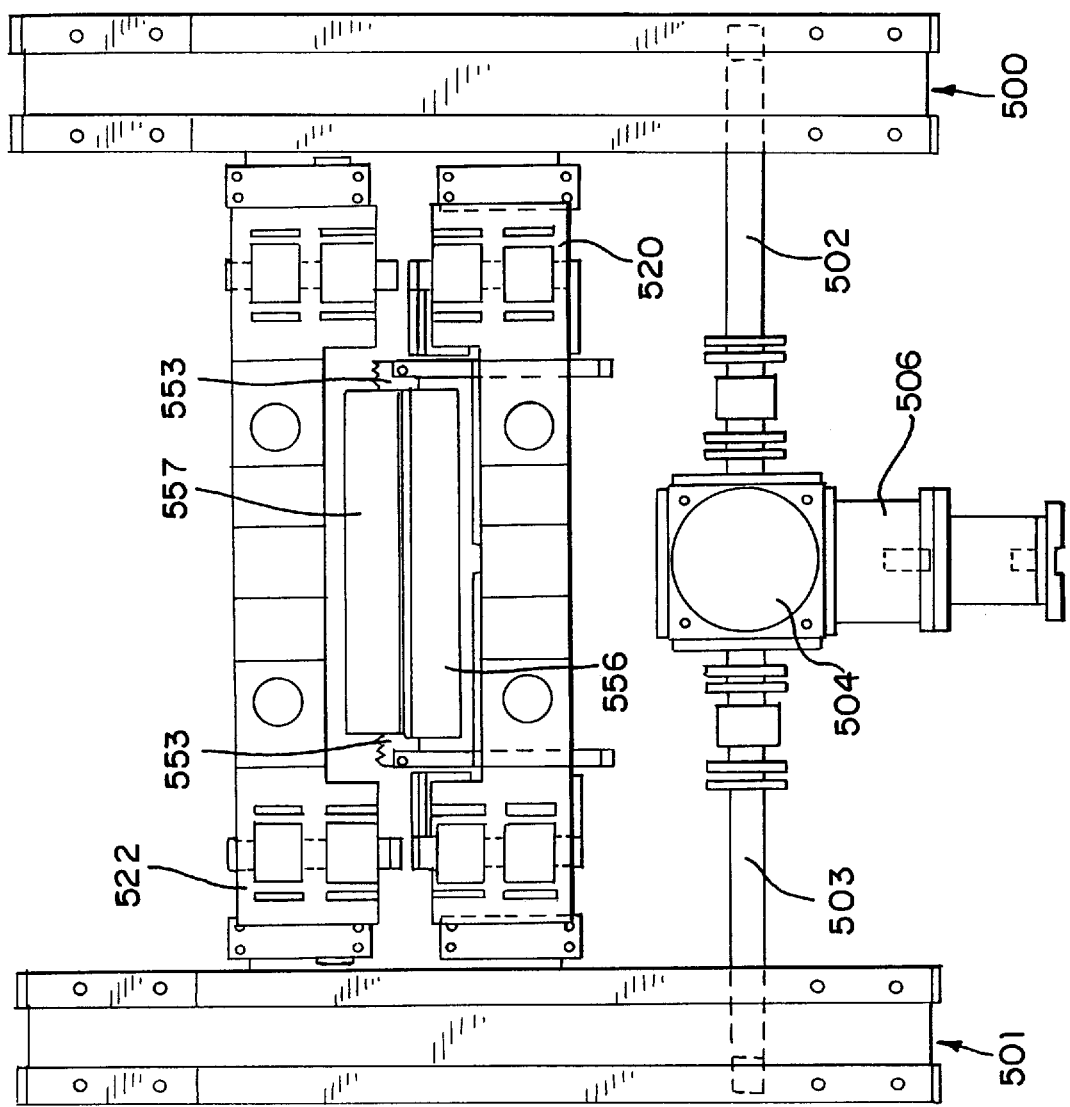
FIG. 18 is a top view of the isolated sealing jaw mechanism.
Figure 19:
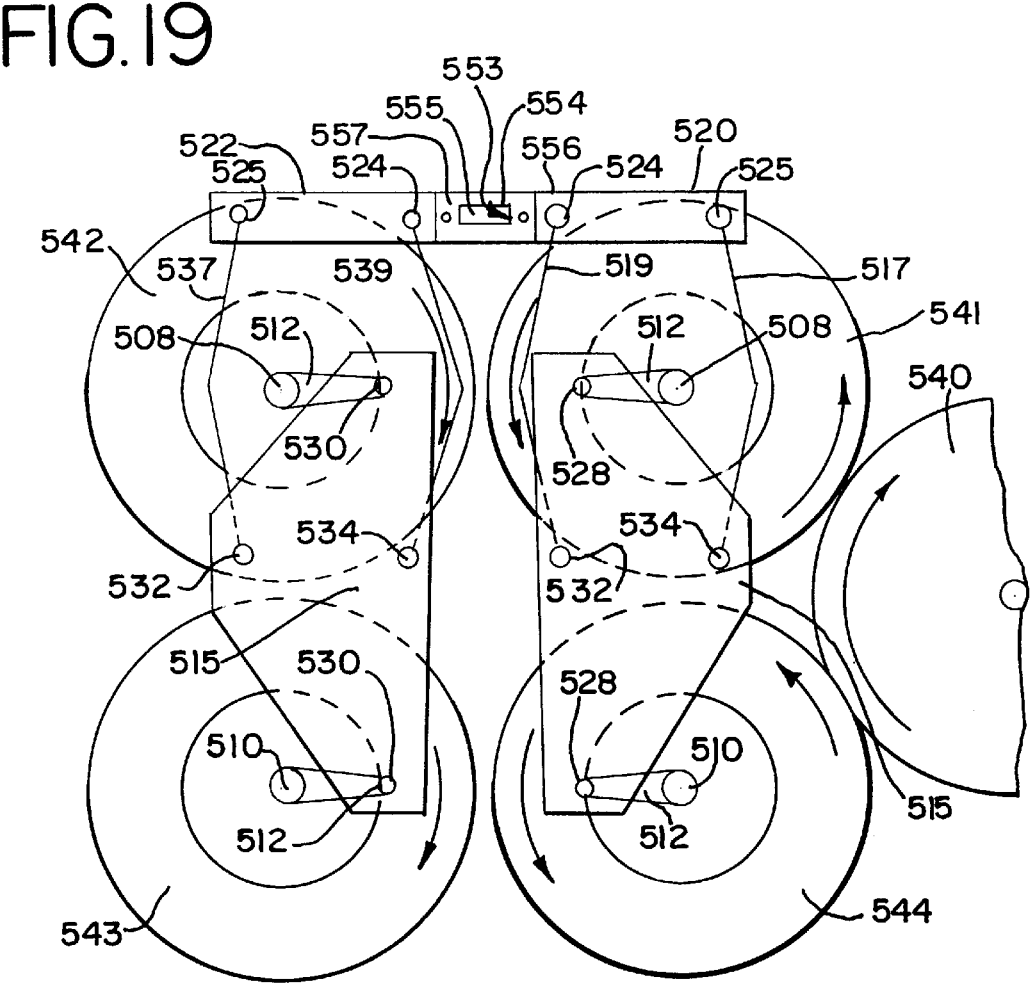
FIG. 19 is, a right side, schematic view of the sealing jaw mechanism 100 and drive.
Figure 20:
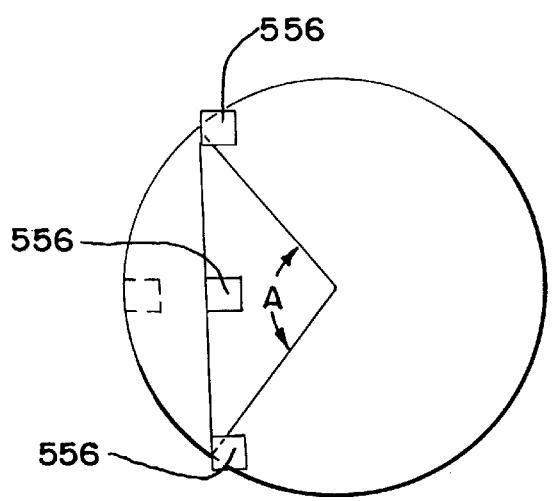
FIG. 20 is a schematic view that illustrates the geometry of the torsion mounts and parallel linkage drive.

The sealing jaw mechanism 100 is shown in FIGS. 12–20. FIGS. 12–18 are views of the preferred embodiment of the sealing jaw mechanism 100 and its drive. FIGS. 19 and 20 are schematic view of the sealing jaw mechanism 100 and drive.

Figure 12:
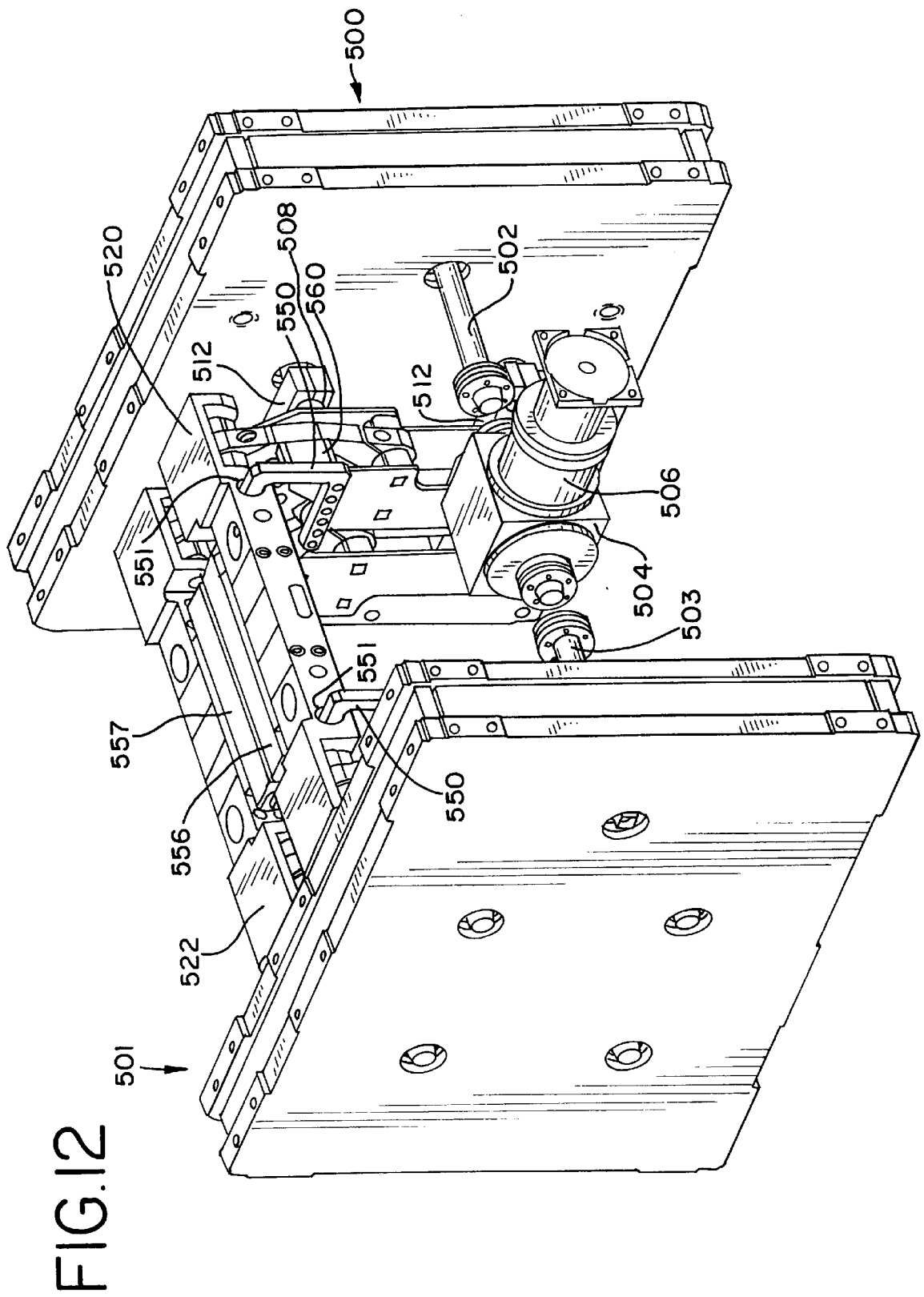
FIG. 12 is a perspective view of the isolated sealing jaw mechanism as seen from the back upper right.

Referring to FIG. 12, which is a view from the rear, the left 500 and right 501 gear cases of the sealing jaw mechanism 100 are shown. Gear cases 500, 501, and thus the entire sealing jaw mechanism 100, are secured by nuts and bolts (not shown) to the lower support members 2 and 3 and vertical columns 14–17 (see FIG. 1) of the form, fill and seal machine 10. Input shafts 502 and 503 are driven through a gear box 504 by a servo motor 506. The servo motor 506 is controlled through a programmable microprocessor which enables the speed and drive intervals to be precisely controlled. The front sealing jaw 557 carried by the front jaw bracket or cyclically moveable jaw assembly 522, together referred to as the front jaw assembly 546, and the rear sealing jaw 556 carried by the rear jaw bracket or cyclically moveable jaw assembly 520, together referred to as the rear jaw assembly 548, are located between the gear cases 500, 501, as best seen in FIGS. 12 and 18. Each gear case 500, 501 has two sets, of spaced output shafts. Each set of spaced output shafts has an upper 508 and a lower 510 output shaft. The forward set of spaced output shafts on both gear cases 500 and 501 drive the front jaw bracket or cyclically moveable jaw assembly 522 and the rear set of spaced output shafts on both gear cases 500 and 501 drive the rear jaw bracket or cyclically moveable jaw assembly 520. Each of the output shafts, 508 and 510 has a crank arm 512 rigidly secured thereto.

The gear cases 500, 501, their output drives and the drives to the cyclically moveable jaw assemblies 520 and 522 are mirror images of each other. For this reason, reference will be made to FIGS. 13 and 14 for a detailed discussion of the drive from the right gear case 501 to the right side of rear jaw bracket or cyclically moveable jaw assembly 520. It should be understood that the drive to the left side of rear jaw bracket or cyclically moveable jaw assembly 520 and to both sides of front jaw bracket or cyclically moveable jaw assembly 520 are identical, to the drive described in detail.

The set of output shafts, comprised of upper 508 and lower 510 parallel and spaced output shafts, project from gear case 501. Output shafts 508 and 510 are synchronously driven in rotary movement. Each output shafts 508, 510 has a crank arm 512 rigidly secured thereto.

The free ends of crank arms 512 carry an upper 528 pivot shaft, and a lower pivot shaft 530. Pivot shafts 528 and 530 are pivotally connected to a linkage base 515. The linkage base is fabricated from spaced parallel plates 509 and 511. An upper bearing 529 and a lower bearing 531 are secured to and span the space between the spaced parallel plates 509 and 511. Upper pivot shaft 528 is received in upper bearing 529 and the lower pivot shaft 530 is received in lower bearing 531. The linkage base 515 also includes front 532 and rear 534 mounts that are secured to the spaced parallel plates 509 and 511 and span the space there between. Mounts 532 and 534 have non circular cross sections. Although, as illustrated mounts 532 and 534 have square cross sections they could have any non circular cross section. The lower ends of front pivot links 519 and rear pivot links 517 are connected to the linkage bases 515 through its front mount member 532 and rear mount member 534 respectively.

Figure 14:
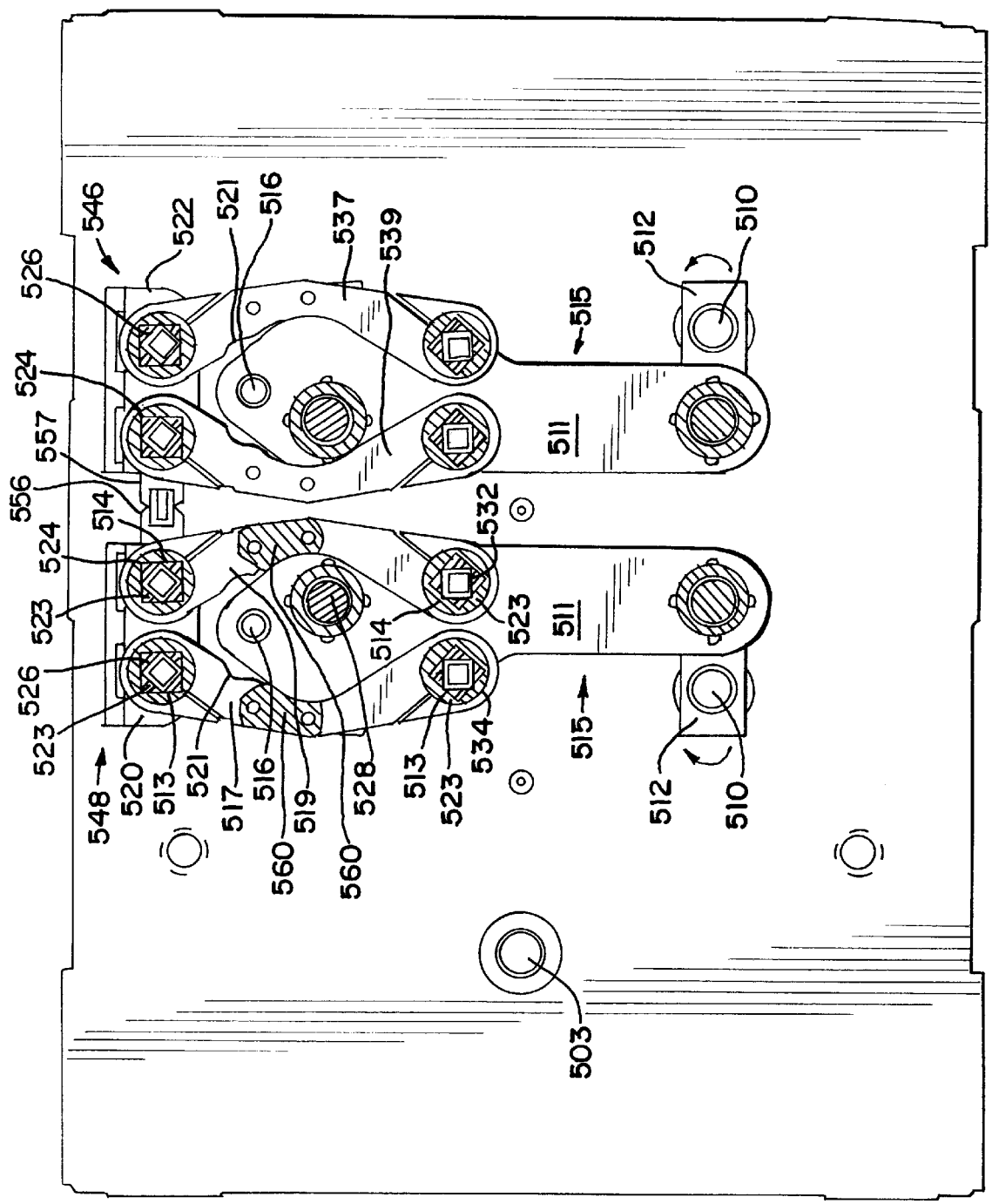
FIG. 14 is a cross section view of the sealing jaw mechanism taken along lines 14—14 of FIG. 13.

The front jaw bracket or cyclically moveable jaw assembly 522 that carries the front sealing jaw 557 and the rear jaw bracket or cyclically moveable jaw assembly 520 that carries the rear sealing jaw 556 are best seen in FIGS. 12 and 18. As best seen in FIG. 14, rear jaw bracket or cyclically moveable jaw assembly 520 has a front mount member 524 and a rear mount member 526 upon which the upper ends of rear parallel link 519 and 517 are respectively connected. The front jaw bracket or cyclically moveable jaw assembly 522 has a front mount member 524 and a rear mount member 526 upon which the upper ends of front parallel link 539 and rear parallel link 537 are respectively connected.

Figure 29:
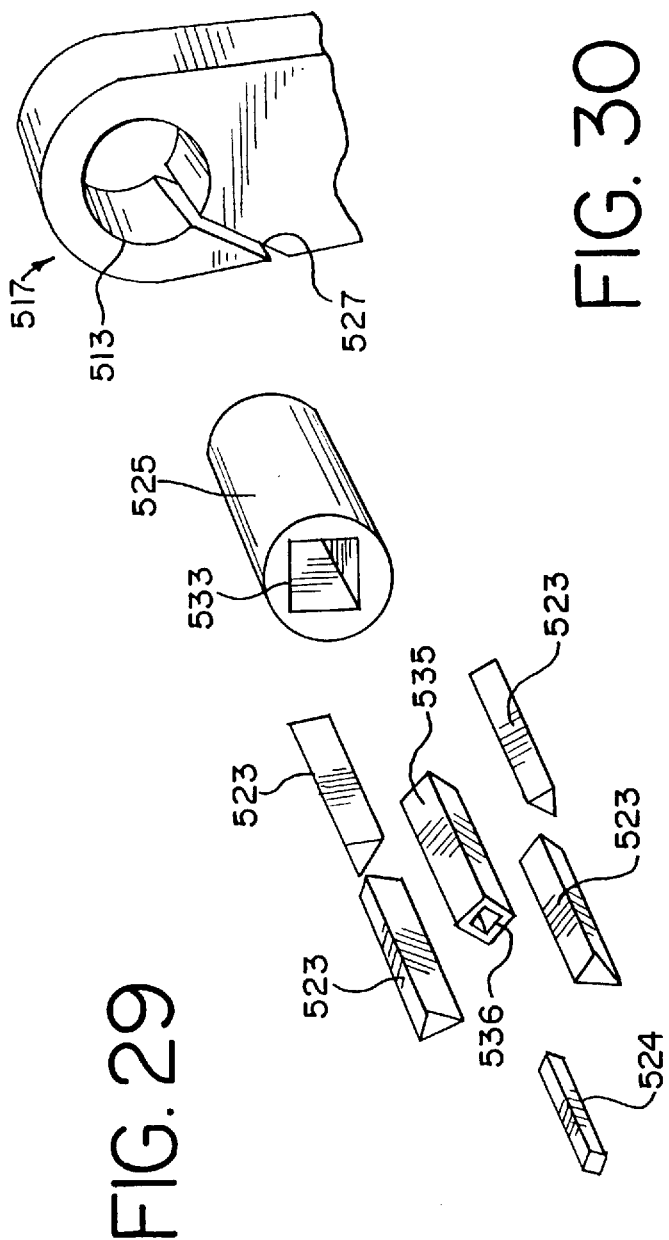
FIG. 29 is an exploded view of one of the pressure devices.
Figure 30:
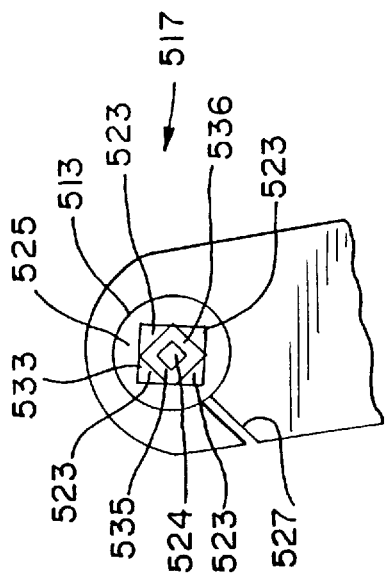
FIG. 30 is a side view of the upper end of a link having a pressure device mounted therein.

Both ends of pivot links 517 and 519 have circular openings 513 and 514 respectively formed therein. The pressure devices that are mounted in each opening 513 and 514 are identical. The following description of the pressure device that is mounted in opening 513 formed in the upper end of pivot link 517, with particular reference to FIGS. 29 and 30, applies equally to the other pressure devices. Opening 513 has a slot 527 that opens to the edge of pivot link 517. A clamping bolt 518 is provided that can close the slot 527 to secure metallic cylindrical member 525 into the openings 513. Cylindrical member 525 has an axially extending non circular opening 533 formed therein. Opening 533 is illustrated as being square, however, it could be any non circular shape. A metallic rod member 535, having a non circular outer cross section shape is received in non circular opening 533. Rod member 535 is dimensioned such that it can rotate within opening 533 about its longitudinal axis relative to member 525. Metallic rod member 535 is illustrated as having a square outer cross section shape, however other non circular cross section shapes could be used. A plurality of elastic members or rubber torsion mounts 523, having cross section shapes that substantially fill the spaces left in opening 533 by rod member 535, are located between opening 533 and rod member 535. Rod member 535 has a non circular axial openings 536 formed therein that is shaped to receive mount 524. Mount 524 is carried by the jaw bracket or cyclically moveable jaw assembly 520 which is secured to the upper ends of pivot links 517 and 519. When the pressure device is contained in the opening 513, as shown in FIG. 30, the elastic members or rubber torsion mounts 523 are at equilibrium and will attempt to locate the pair of cyclically moveable jaw assemblies at an equilibrium position relative to the corresponding link bases. The link bases 515, parallel links 517 and 537 and pivot connections including said pressure devices function to bias said pair of cyclically movable jaw assemblies toward each other in arcuate paths while maintaining one jaw assembly parallel with respect to the other jaw assembly. The clamping bolts 518 can be loosened, the pressure devices rotated within the circular openings 513 and the clamping bolts again tightened. This results in a means for adjusting the pressure exerted by said cyclically movable jaws toward each other independently of said jaw assembly equilibrium position.

The rear linkage base 515, as seen in FIG. 14, has a front mount member 532 and a rear mount member 534 upon which the lower ends of parallel link 519 and 517 are respectively connected. The bottom ends of pivot links 517 and 519 have circular openings 513 and 514 respectively formed therein that also receive pressure devices including metallic cylindrical members 525, rod members 535 and torsion mounts 523 as fully described above.

A stop 516 is also secured to and spans the space between the spaced parallel plates 509, 511 of each linkage base 515. Stops 516 are cylindrically shaped rods and are easily replaced with stops of different diameters for a purpose to be discussed. An arrows in FIG. 14, around the lower output shafts 510, for the rear jaw bracket or cyclically moveable jaw assembly 520, indicates that the direction of rotation for both output shafts 508 and 510 (508 not visible in FIG. 14) is clockwise. It should be noted that the output shafts 508 and 510 for the front jaw bracket or cyclically moveable jaw assembly 522, as seen in FIG. 14, rotate in the opposite or counter clockwise direction. The rotation of the output shafts 508, 510, crank arms 512 and pivot shaft 528 cause the linkage bases 515 to rotate in circular paths.

As a result of the output shafts 508, 510 for the front jaw bracket or cyclically moveable jaw assembly 520 and rear jaw bracket or cyclically moveable jaw assembly 522 rotating in opposite directions, the linkage bases 515 also rotate in opposite directions. The rotational direction of the linkage bases 515 is such that they approach each other during the upper half of their orbit and recede from each other during the lower half of their orbit.

The rubber torsion mounts 523 included in the connections of the upper and lower ends of each parallel link 517,519,537,539 bias the parallel links 517 and 537 into contact with stops 516. Stop engaging portions of parallel links 517 and 537, having notches 521 formed therein, engage the stops 516. When the stop engaging portions of parallel links 517 and 537 are in engagement with the stops 516 movement of said cyclically movable jaw assemblies to their equilibrium position is prevented. The rubber torsion mounts 523 permit links 517 and 537 to move away from the stops 516 as shall be further discussed. However, the rubber torsion mounts always bias the inks 517 and 537 back into engagement with the stops 516.

The parallel links 517,519,537,539 have notches 521 formed therein that are located and dimensioned to receive the stop 516 that is carried by the linkage bases 515. Engagement of the notches 521 with stops 516, as a result of torque transmitted to parallel links 517,519,537,539 by the rubber torsion mounts 523, establishes a fixed limits for this movement relative to their linkage bases 515.

The front and rear linkage bases 515 are dimensioned and located relative to each other such that they can rotate in their circular paths without interfering with each other. However when notches 521 are in engagement with stops 516, the front 557 and rear 556 sealing jaws which are carried by the front jaw assembly 546 and rear jaw assembly 548 respectfully, would theoretically interfere with each other during the cycle of the linkage bases 515. The initial contact of front 557 and rear 556 sealing jaws is represented in FIG. 19. As illustrated in FIGS. 19 and 20 initial contact of front 557 and rear sealing jaws occurs at about 54/above horizontal. As best illustrated in FIG. 20 the sealing jaw 556 moves vertically downwardly, along a cord 657, after initial contact with sealing jaw 557 to the point, which is about 54/below horizontal where it intersects the circular arc that it normally follows. As a result, as illustrated in FIG. 20 the sealing jaws travel vertically downwardly for a total arc of about 108/which is about 30% of the total mechanical cycle. The length of the cord 657 can be adjust to accommodate different operating conditions by replacing the cylindrically shaped stops 516 with larger or smaller cylindrically shaped stops. A smaller diameter stop 516 will result in a shorter cord 657 and a larger diameter stop 516 will result in a longer cord 657. Actual interference is avoided since, upon engagement of the front 557 and rear 556 sealing jaws, the rubber torsion mounts 523 allow the parallel links 517 and 537 to back away from engagement with stops 516. Initial engagement of the sealing jaws 557 and 556 commence as the sealing jaws 557 and 556 are moving downwardly. The sealing phase of the cycle begins at this initial engagement of the sealing jaws 557 and 556 and continues until the parallel links 517 and 537 start moving back toward engagement with stops 516. The rubber torsion mounts 523 in the link mounts allow the sealing jaws 557 and 556 to remain engaged under pressure and move vertically downwardly during the entire sealing phase. During the sealing phase the notches 521 of parallel links 517 and 537 do not engage stops 516. The speed of servo motor 506 is set by the micro processor controller during the sealing phase such that the downward movement of the sealing jaws 557 and 556 is synchronized with the downward movement of the tubular container being formed. The parallel links 517 and 539 begin moving back toward the stops 516 at the completion of the sealing phase. At the point in the cycle when the rubber torsion mounts 523 cause the sealing jaws 557 and 556 to begin moving away from each other the sealing phase has been completed. At this point in the cycle the servo motor 506 can be sent a signal by the micro processor controller to increase its speed for the non sealing phase of the cycle. The speed of the jaws can be slowed down as they approach each other to thereby reduce the sound that is created when they engage. As a result the sealing phase of the cycle can be set to have an optimum or maximum duration for the product being produced. Stops 516 can be made of rubber or plastic, such as nylon, which provides the advantage of diminishing the sound created when they are engaged.

Figure 13:
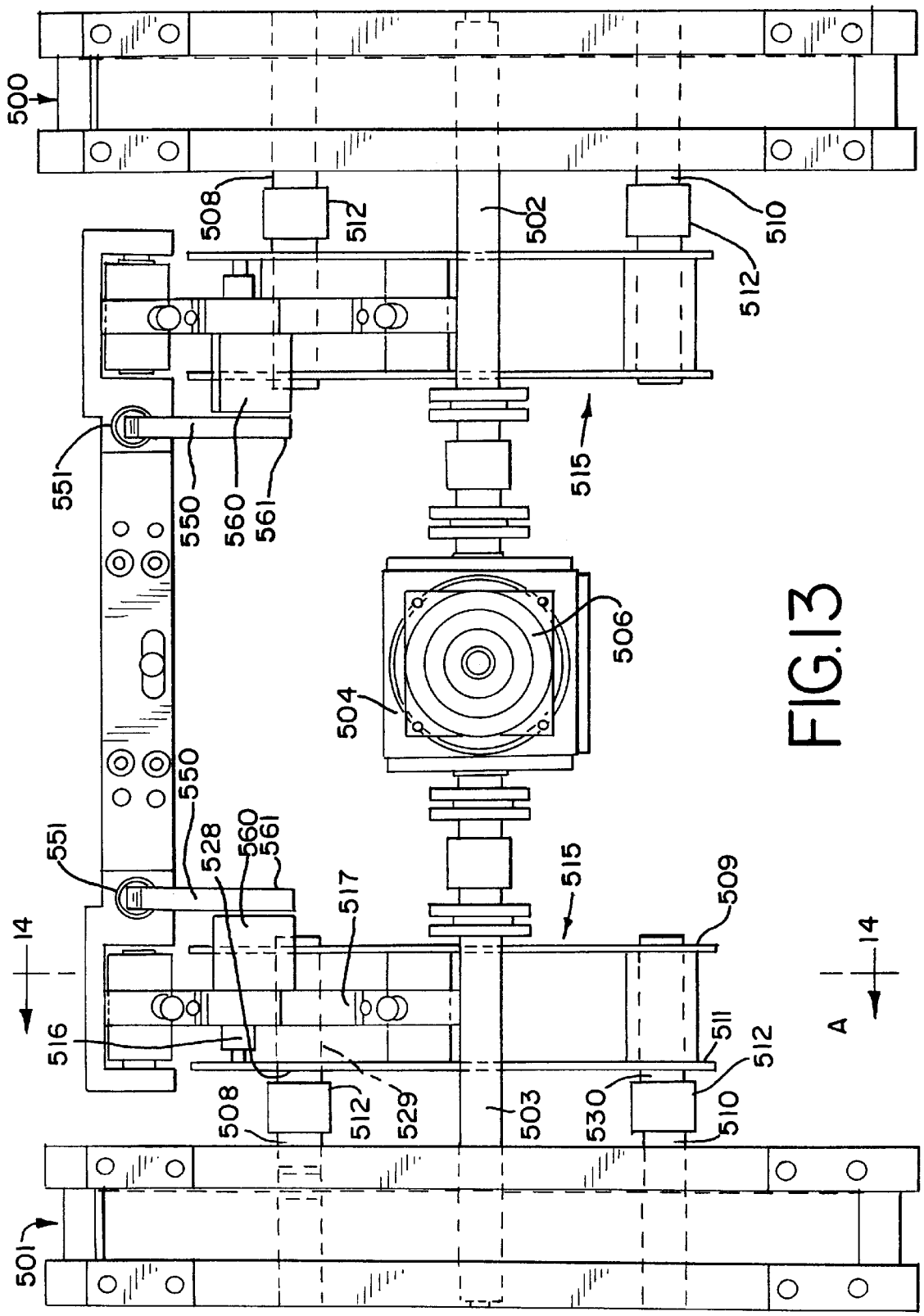
FIG. 13 is a back view of the isolated sealing jaw mechanism.

A knife blade 553 is fixed relative to the rear linkage bases 515 and thus its movement is not effected by the rubber torsion mounts 523. When the parallel links 517 and 537 are in engagement with stops 516 the knife blade 553 is nested within a horizontal groove 554 formed in the front vertical surface of the rear sealing jaw 556. The front sealing jaw 557 has a horizontal blade receiving groove 555 formed therein that is aligned with horizontal groove 554 when the sealing jaws 557 and 556 are engaged. Each end of knife blade 553 is secured to a free end portions of the top leg of a U-shaped mounting brackets 550. As best seen in FIG. 12, the bottom legs of U-shaped mounting brackets 550 are mounted by pivot shafts on the front 519 and rear links 517. As best seen in FIGS. 12 and 13 links 517 and 519 have offset mounting blocks 560 that extend centrally such that the mounting brackets 550 are located centrally of the link bases 515. Link 517 and 519 each carry a mounting bracket 550 that moves together with the links. The upper horizontal legs, of the U-shaped mounting brackets 550, extend through horizontal bores 551 formed in the rear jaw bracket or cyclically moveable jaw assembly 520. The free end of the upper horizontal legs, that extend through horizontal openings 551, are secured to the knife blade 553. The lower horizontal legs, of the U-shaped mounting brackets 550 are pivotally connected by pivot pins 561 to links 517 and 519. As a result of the pivot mounting of the mounting bracket 550 on links 517 and 519, the distance of movement that is imparted to the knife blade 553 depends on the distance from the pivot pins 561 to pivot points of the corresponding links 517 and 519. This relationship allows the knife 553 to retract less then the jaws 556 and 557 during the engagement of the jaws 556 and 557 and thus allows the knife to pass through the center line between the jaws 556 and 557 to sever the film. When the sealing jaws 557 and 556 initially engage, resulting in the horizontal component of movement of rear sealing jaw 556 to cease, the knife blade 553 continues to move forward until the jaws reach the center to their vertical travel. The continued movement of knife blade includes a horizontal component and knife blade 553 thus moves out of the horizontal blade mounting groove 554 formed in the rear jaw bracket or cyclically moveable jaw assembly 520. As the knife blade 553 moves out of the horizontal blade groove 554 it moves into horizontal blade groove 555 that is formed in the front surface of front sealing jaw 557. In doing so the knife blade 553 perform its cutting function.

Figure 15:
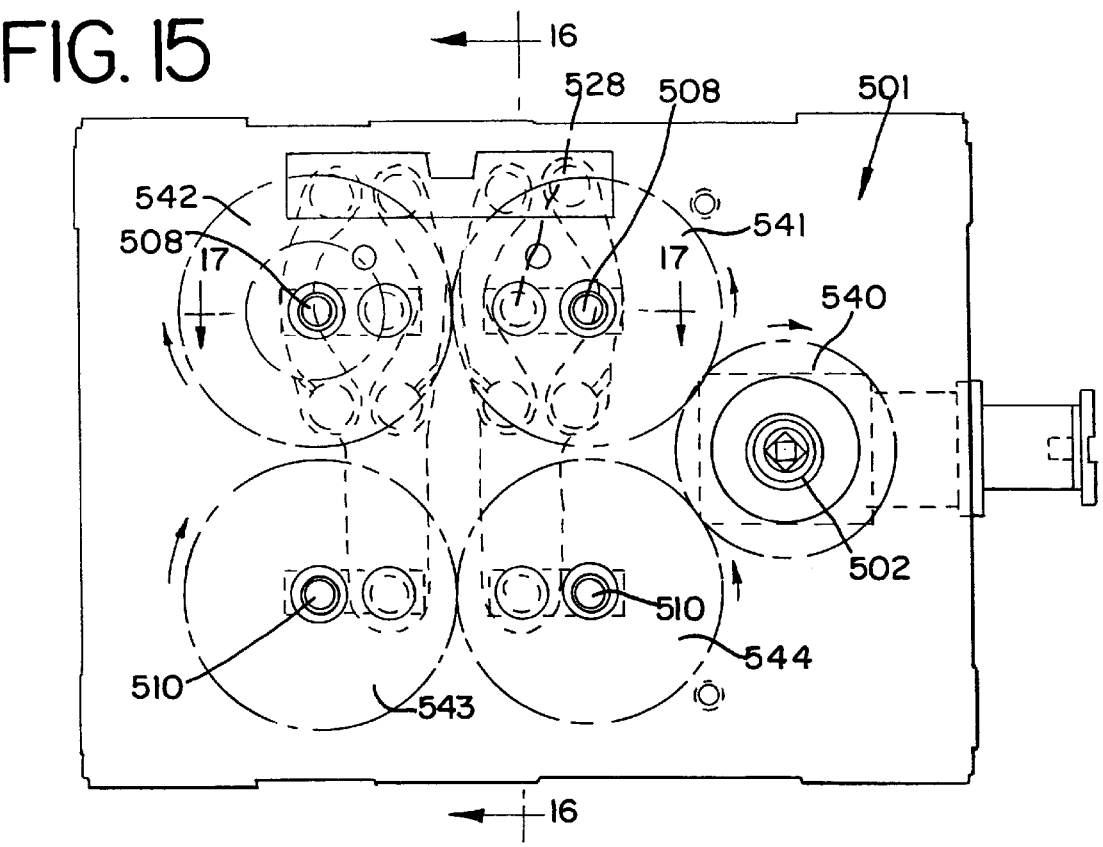
FIG. 15 is a side view of the right side of the isolated sealing jaw mechanism.
Figure 16:
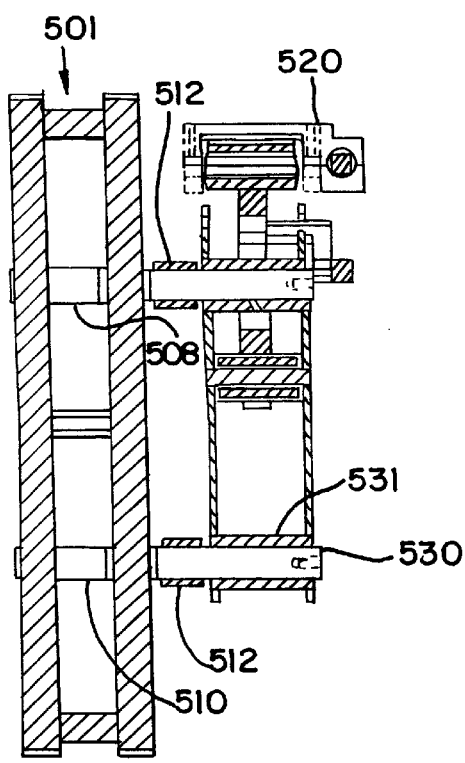
FIG. 16 is a cross section view of a portion of the sealing jaw mechanism taken along lines 16—16 of FIG. 15.

The gear cases 500 and 501 will be discussed with reference to FIG. 15 through 17. Each gear case 500, 501 includes a driver gear 540 that is carried by input shafts 502 and 503 respectively. The speed of driver gear 540 in each gear case 500 and 501 will always be identical and under the control of servo motor 506. As seen in FIG. 15 driver 540 rotates in the clockwise direction. Driver gear 540 meshes with and thus drives upper rear drive gear 541 and lower rear drive gear 544. Upper rear drive gear 541 and lower rear drive gear 544 are identical, that is they have the same diameter and the same number of teeth, and thus are driven at equal speeds by driver 540. Both upper rear drive gear 541 and lower rear drive gear 544 are driven in the counter clockwise direction. Upper rear drive gear 541 is secured to upper output shaft 508 and lower rear drive gear 544 is secured to lower output shaft 510. Upper rear drive gear 541 meshes with upper front drive gear 542, which is identical to upper rear drive gear 541, and thus drives upper front drive gear 542 at the same speed but in the opposite, clockwise, direction. Upper rear drive gear 542 is secured to upper output shaft 508 and lower rear drive gear 543 is secured to lower output shaft 510. Lower rear drive gear 544 meshes with lower front drive gear 543 and thus drives lower front drive gear 543 at the same speed but in the opposite, clockwise, direction. It should be noted that, to simplify FIG. 16, upper rear drive gear 541 is not shown on the output shaft 508 and lower rear drive gear 544 has not been shown on output shaft 510. It should also be noted that, to simplify FIG. 17, upper rear drive gear 541 and upper front drive gear 542 have not been shown on the output shafts 508.

The film cage 600, see FIG. 24, includes a pair of side plates 610 that are maintained in relative parallel relationship by a cylinder bar mounting 602, rollers 604, 605 and 606. The film cage 600 is pivotally mounted on the rear support member 11 of the form-fill-seal machine 10. The pivotal connection between the frame 11 of the form-fill-seal machine 10 and the film cage 600 can be seen in FIGS. 1, 4 and 5 and in FIG. 22 which is an exploded view of the mounting mechanism and the film tracking assembly.

Figure 22:
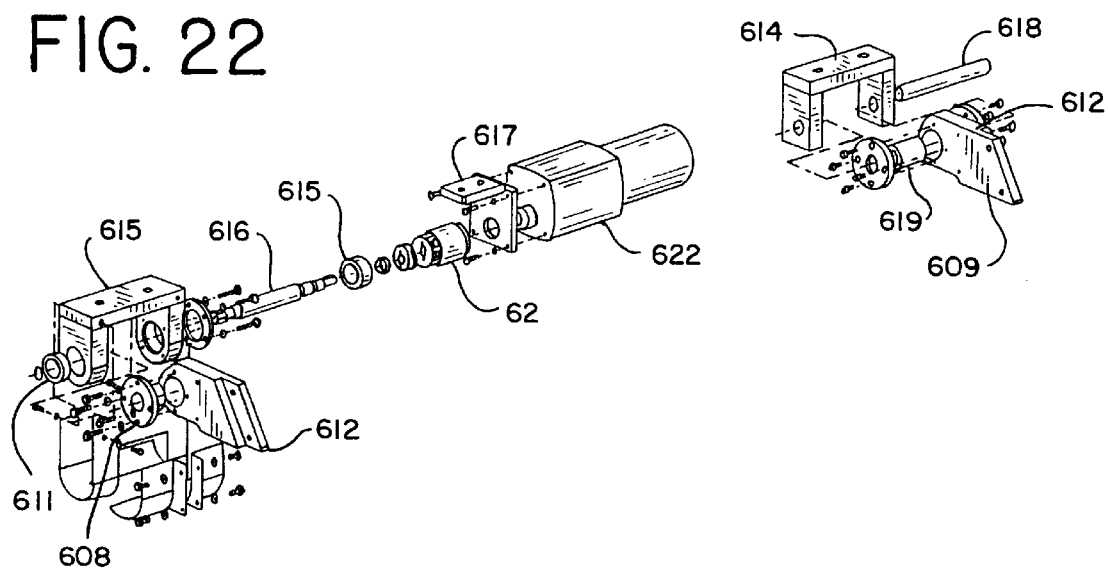
FIG. 22 is an exploded perspective view of the film tracking assembly.

As is best seen in FIG. 22, a right 609 and a left 612 film cage support are secured, for example by nuts and bolts to apertures 613 formed in the lower front edges of side plates 610 (see FIG. 24). The right film cage support 609 has a bore at its forward end that carries a bearing 619. The left film cage support 612 has an internally threaded adjustment nut 608 secured in a bore at its forward end. Film cage adjusting brackets 614 and 615 and the motor mounting bracket 617 are, as best seen in FIGS. 1, secured to the rear support member 11 of the form-fill-seal machine 10. The right film cage adjusting bracket 614 includes downwardly extending spaced flanges that have aligned apertures that receive an idler shaft 618 upon which the bearing 619 can slide axially. The left film cage adjusting bracket 615 includes downwardly extending spaced flanges that have aligned apertures that receive an externally threaded drive shaft 616 that meshes with the internally threaded adjustment nut 608. Externally threaded drive shaft 616 is driven through a flexible coupling 620 and gears by a motor 622 that is carried by the motor mounting bracket 617. When motor 622 is actuated it causes rotation of externally threaded drive shaft 616 which causes the internally threaded adjustment nut 608 to move axially along the externally threaded drive shaft 616. The axial movement of adjustment nut 608 carries the entire film cage 600 with it. It should be noted that the range of axial movement of the film cage is limited by the space between the downwardly extending spaced flanges on the brackets 614 and 615. The externally threaded drive shaft 616 is driven through a flexible coupling 620 and gear box by the motor 622. Upon actuation of motor 622 the film cage 600 is moved to the right or left adjust or correct the tracking of the film. A very important advantage of the subject invention is that as a result of the film tracking and pivoting of the film cage being performed on the same axis, the film cage 600 can be pivoted between the operative and loading position without disrupting the adjustment of the film tracking. As a result of both systems being on the same axis, either can be adjusted without placing stress on or changing the adjustment of the other. As a result when a film roll is used up, the operation of the machine is stopped and the film cage 600 is pivoted to the vertical loading position. At this vertical position the spent roll is removed and a new role 625 is rolled up to the rear of the machine. With the film cage 600 in the vertical loading position, the film roll mounts 624 have been lowered to a height where a new film roll 625 can be rolled onto the mounts 624 without lifting the role. The film from the new film role must then be threaded through the plurality of rollers of the film cage. This procedure has been simplified as a result of the film cage now being in the vertical position since the film cage and the rollers are closer to the operator who is behind the machine. In prior art machines, the film cage and associated rollers are inclined toward the center of the machine and the person threading the film through the rollers must reach into the center of the machine to reach the rollers. Furthermore, with the film cage 600 in the vertical loading position, the person threading the film can grasp a dancer arm 644 or 645 and pivot it to the horizontal position at which position the dancer rolls 630 and 632 are much closer to the person and there is an open horizontal slot between the dancer rolls 630, 632 and the roll 605 that they interact with through which the film can be threaded. After the film from the new film role 625 has been threaded and spliced to the end of the old film, the film cage 600 can be pivoted to the operative inclined position. The adjustment of the film tracking has not been changed or disturbed in any way and the machine can be restarted without making time consuming adjustments.

Figure 25:
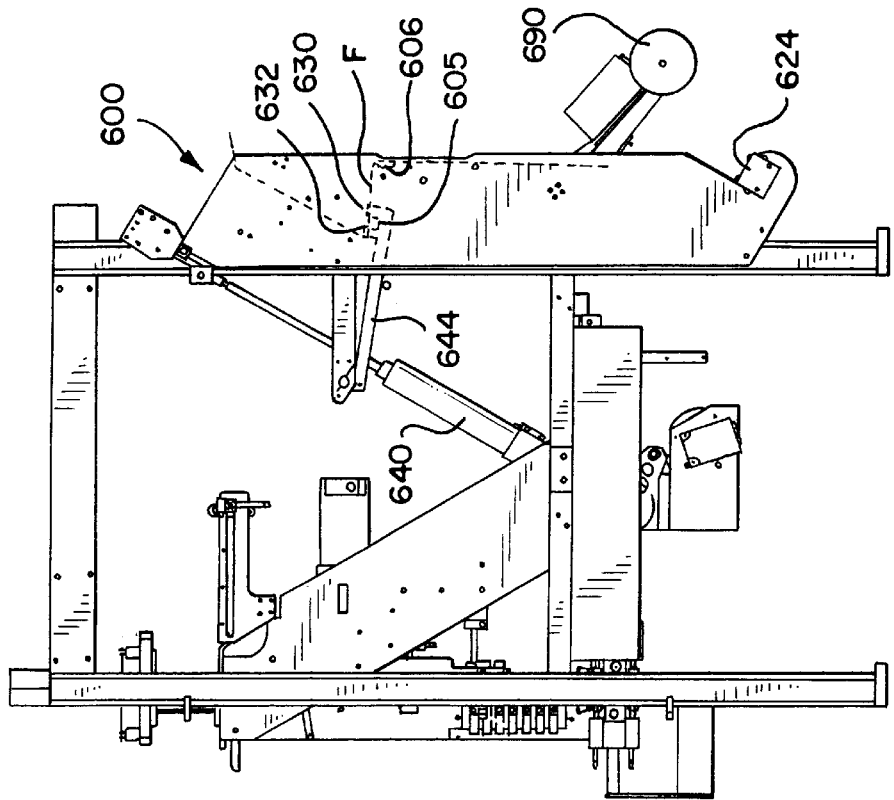
FIG. 25 is a schematic side view of the machine with the film cage in the vertical loading position, when the film is not loaded.

The rod end of a pneumatic air cylinder 640, see FIG. 25, is pivotally connected to the cylinder bar mounting 602 at the top front of the film cage 600. The head end of cylinder 640 is secured to the mid support member 9 of the machine 10. Actuation of cylinder 640 pivots the film cage 600 about shafts 616 and 618 from the inclined operative position to the vertical film roll loading position.

The film roll loading position of the film cage 600 provides the advantage that the position of the film roll mounts 624 have pivoted down about the axes of shafts 616 and 618 to a lower level. At this lower level of the film roll mounts 624 it is possible to mount new film rolls 625 on the mounts 624 without the need of an overhead hoist or other such power equipment. Thus, when it is necessary to load a new film roll 625 on the machine 10, the machine operator can without additional help or special power equipment simply roll the new film roll 625 onto the film roll mounts 624.

Another advantage that is gained by moving the film cage 600 to its vertical film roll loading position is that it greatly facilitates the threading of the film through the series of rollers that controls the film. As a result of tilting the film cage to its vertical position, the rolls are much closer to a person located at the rear of the machine 10 and, thus, it is not necessary for the person loading the film to reach into the center of the machine to thread the film around the rollers. A particular difficult set of roller to load the film around are those known as the dancer rollers 630 and 632. The dancer rollers 630, 632 are not fixed relative to the film cage side plates 610 but rather are carried at the ends of dancer arms 644 and 645 that are pivotally mounted to allow them to float.

The dancer rollers 630 and 632 and their mounting mechanism are best seen in FIG. 24 and exploded view FIG. 23. Arms 634 are secured to side plates 610 and extend from the front edges of the side plates 610 toward the front of the machine 10. Arms 634 are rigidly connected to the side plates and terminate in free ends. The free ends of arms 634 are connected by a torsion tube assembly that includes a rod 636 that is secured at its ends to the arms 634. Rod 636 extend down the center of an elongated coil spring 638. A torque tube 640 receives the coil spring 638 and rod 636. One end of coil spring 638 is secured to rod 636 and the other end is anchored in the torque tube 640. This functions as a counterbalance to the torque tube 640 which is transferred to the dancer rollers 630 and 632. By changing coil spring 638 the tension exerted on the film can be changed to better accommodate a particular use of the machine. The torque tube 640 has a mounting tab 642 at each end to which are rigidly secured dancer arms 644 and 645. At the free ends of dancer arms 644 and 645 are secured U-shaped brackets 646 and 647 respectively. U-shaped bracket 646 has free ends 648 and 649 and U-shaped bracket 647 has free ends 650 and 651. Free ends 648 and 650 are connected by a rod 652 upon which is mounted the dancer roller tube 630. Free ends 649 and 651 are connected by a rod 654 upon which is mounted the dancer roller tube 632. The torque exerted by spring 638 provides a counterbalancing force to the dancer roller tubes 630 and 632 which effects the tension that these rolls apply to the film. The spring 638 can be replaced by one of different tension if it is desired to change the tension being applied to the film. However, the torque provided by spring 638 is not sufficient to hold the dancer arms 644 and 645 and the dancer rolls 630 and 632 up when the rolls are not in engagement with the film. Thus, the film holds the dancer up when the film is not threaded through the dancer rolls 630 and 632. When film is not threaded through the dancer mechanism, the dancer arms 644 and 645 along with the dancer rolls 630 and 632 hang vertical down like a pendulum. When the operation of the machine is stopped the weight of the dancer arms 644 and 645 along with the dancer rolls 630 and 632 cause them to move downwardly. Since the movement of the dancer is effected by its weight, which is constant, the location of the dancer does not effect the tension exerted on the film by the dancer. The main function of the dancer rolls is to speeds up or slows down the power unwind of the film from the film roll 625. When the dancer gets high the power unwind speeds up and when the dancer gets low the power unwind slows down. When the operation of the machine is stopped the dancer goes low because you are no longer using film. This slows down the power unwind as the dancer drops until it finally it is in its lowest most position. The tension on the film is not effected or changed as a result of the position of the dancer.

When operation of the machine is initiated, the dancer rolls are at their lowest position. An operator who is threading the film from the film roll 625 through the series of rollers, grasps a dancer arm 644 or 645 and raises the dancer rollers 630 and 632 up toward the position that they are in during operation. As a result of the film cage 600 being in its vertical position there is a straight path between the dancer rollers 630, 632 and the cooperating roller 605 and 606 through which the film can be conveniently threaded. After the film is threaded between the dancer rollers 630, 632 and the cooperating rollers 605 and 606 the operator can release the dancer arm 644 or 645 and the dancer rollers 630, 632 will gravitate downwardly. The power unwind of the large film roll 625 starts from zero and increases to its selected speed. The machine is consuming film during this start up when the film roll 625 is accelerating to its operating speed. During this start up period the dancers pivot up which release the film that was accumulated when they moved down to be available for consumption is first several cycles of the machine.

The dancer rollers work in cooperation with rollers 605 and 606 that are fixed relative to the side plates 610, and the film must be threaded between the dancer rollers and the cooperating fixed rollers. This greatly simplifies and speeds up the procedure for loading a new film roll 625 onto the machine and enables the complete operation to be done by one person without the need of special power equipment.

Figure 26:
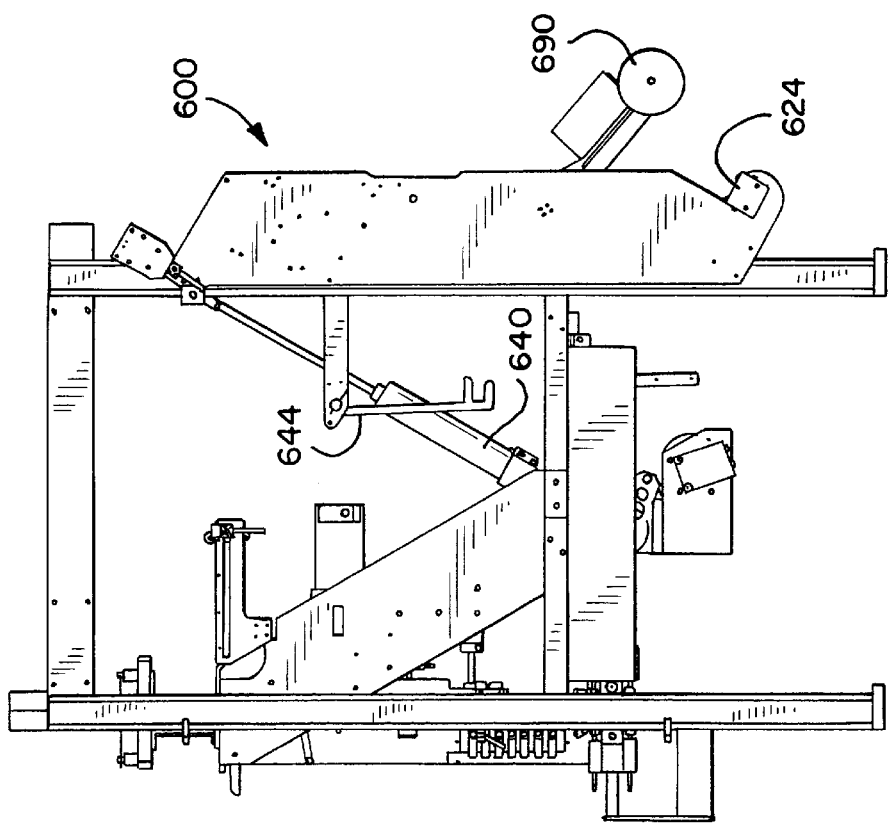
FIG. 26 is a schematic side view of the machine with the film cage in the vertical loading position and the film loaded, as shown by the broken line.

Reference is made to the series of FIGS. 25–28, which illustrate the film cage 600 in its operative position (FIGS. 27 and 28) and its vertical loading position (FIGS. 25 and 26). In FIG. 25, film is not loaded through the series of rolls carried by the film cage 600 and thus the dancer arms 644, 645 are hanging down in a vertical position. In the vertical loading position of the film cage seen in FIG. 25 the film roll mounts 624 for the film roll 625 are at there lowered position. At this lowered position a new roll can be rolled up to and easily placed on the film roll mounts 624. The loading of the film roll 625 can be accomplished by hand by a single operator and the need for power equipment such as an overhead crane is not required. Also, with the film cage in the position illustrated in FIG. 25, an operator standing directly behind the film cage 600 is within reach of the rollers 604, 605, 606 carried by the film cage over which the film is strung.

In FIG. 26, the series of rolls carried by the film cage 600 are represented by broken line circles and the film is represented by a broken line F. When the operator is threading the film from a new film roll 625 through the series or rolls a dancer arm 644 or 645 is grasped by the operator and pivoted up toward the operator to a horizontal position. In this horizontal position the dancer rollers 630 and 632 are aligned in a horizontal plane that is spaced above the horizontal plane of film cage rollers 605 and 606. There is a horizontal opening between the horizontal plane of the dancer rollers 630, 632 and the horizontal plane of firm cage rollers 605, 606 through which the film can be inserted in the film threading process. This simplifies the film threading process considerably since not only are the film cage rollers located at an easy reach to the operator the film can be properly threaded around rollers 630, 632, 605 and 606 by merely passing it through a horizontal opening between two sets of rollers.

Figure 27:
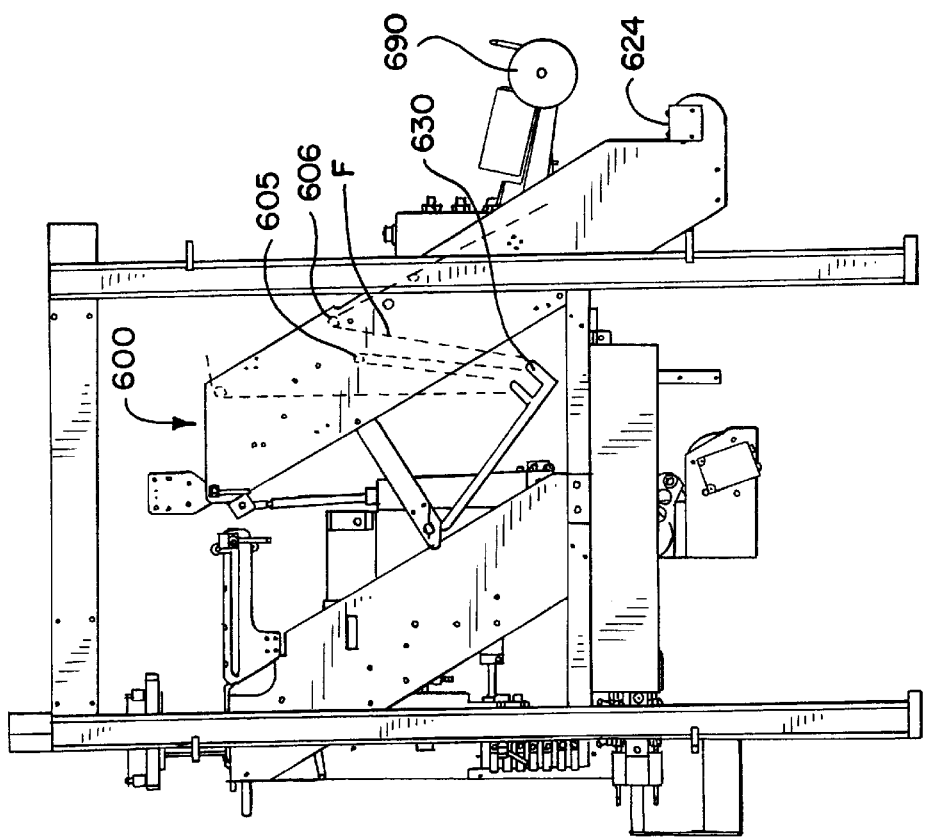
FIG. 27 is a schematic side view of the machine with the film cage in its inclined operative position and the dancer arms shown moved toward the vertical position.

In FIG. 27, the film cage 600 is shown pivoted to its inclined processing position and the operator has released the dancer arms 644 and 645 which have moved by gravity toward a vertical position. In this position of the film cage 600 and dancer arms 644 and 645 the film follows a festoon like pattern between the rollers 630, 632, 680 and 682. A considerable length of film is consumed by the flights extending between the rollers.

Figure 28:
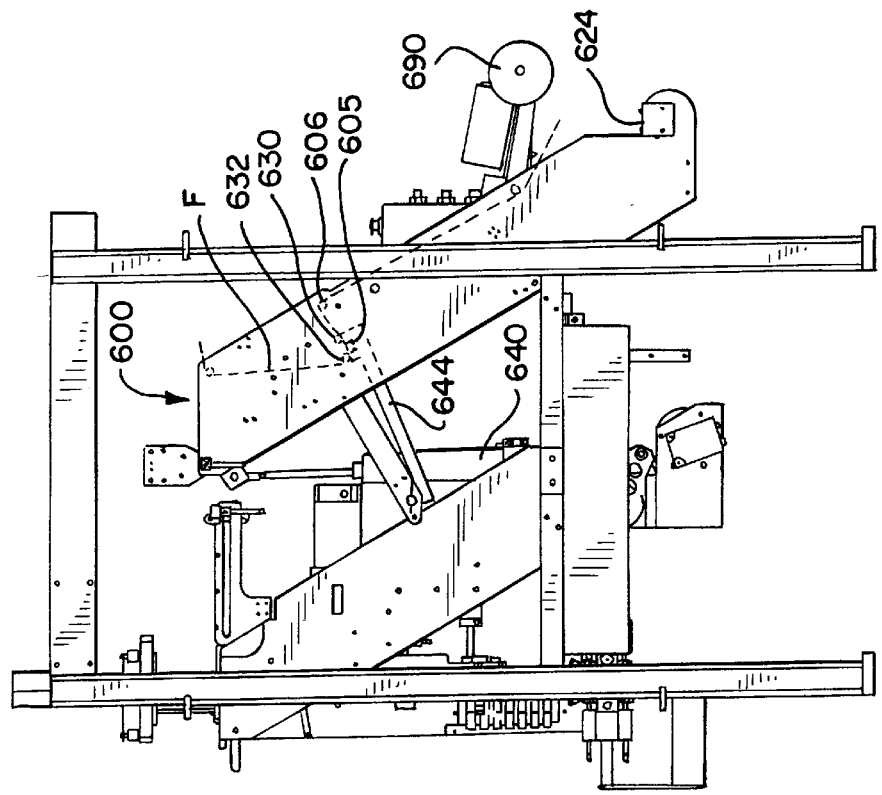
FIG. 28 is a schematic side view of the machine with the film cage in its inclined operative position and the dancer arms shown in their normal operative position.

When the operation of the machine is began the power feed 690 for the film roll 625 is turned on however the relatively large film roll 625 requires time to accelerate to its operating speed. During this start up period the bag forming components of the machine reach operating speed almost instantaneously. The lengths of film that were created as a result of the dancer arms 644 and 645 hanging down toward the vertical position is used during the start up period. When these lengths of material have been exhausted, the power feed 690 for the film roll 625 has reached its operating speed and sufficient film is being dispensed from the roll to accommodate the bag forming operation. The elimination of these stored film lengths causes the dancer arms 644 and 645 to pivot up such that the dancer rolls 630, 632 move to a position above the roller 605. This position of the dancer arms 644 and 645 and the dancer rolls 630 and 632 is illustrated in FIG. 28. FIG. 28 illustrates the position of the dancer arms 644, 645 during normal operation of the machine.

When the machine is turned off, the power to the power feed 690 for the film roll 625 is not turned off and continues to respond to the position of the dancer. However, now film is not being consumed at the other end of the film sheet and the dancer moves to its lower most position and functions to maintain tension on the film. The sensor on the dancer functions to reduce the voltage supplied to the power feed direct current motor as the dancer moves lower. Thus, the voltage supplied to the motor continues to decrease while maintaining tension on the film and eventually there is insufficient voltage to drive the motor. When the machine is started and consumption of the film is resumed, the dancer begins to move up, thus increasing the voltage to the motor, and feeding of the film is resumed.

While the invention has heretofore been described in detail with particular reference to illustrated apparatus, it is to be understood that variations, modifications and the use of equivalent mechanisms can be effected without departing from the scope of this invention. It is, therefore, intended that such changes and modifications be covered by the following claims.

What is claimed is:

1. A form, fill and seal machine, for forming a tube out of a sheet of material, said machine being of the type including a longitudinal seam sealer for continuously forming a longitudinal seam along lapped edge surfaces of the sheet of material during the movement of the sheet of material and a pair of cyclically movable jaw assemblies arranged on opposite sides of said tube that form cross seams during the end sealing operation and wherein the longitudinal seam sealer comprises:

a pair of sealer bars each of which includes a shaped confronting portion, each sealer bar including an electric heat producing element that will when energized heat said shaped confronting portions to a temperature that will cause a seam to be formed between said lapped edge surfaces of the sheet material passing there between;

a separate mounting mechanisms for each sealer bar that permit said shaped confronting portions to move toward and away from each other;

a stop mechanism carried by said mounting mechanism for preventing said shaped confronting portions from contacting each other and thus avoiding unacceptable drag on said sheet of material;

a first pressure roller mounted on one of said mounting mechanisms at a location beyond the exit end of said shaped confronting portions, said first pressure roller engaging an outer surface of the lapped edge surfaces of the sheet of material along which a seam has been formed;

a second pressure roller mounted on the other of said mounting mechanisms at a location beyond the exit end of said shaped confronting portions, said second pressure roller engaging the other outer surface of the edges of the sheet of material along which a seam has been formed, said second pressure roller being mounted for movement relative to said other mounting mechanisms such that it can move toward and away from said first pressure roller, a mechanism for applying a resilient force on said second pressure roller causing it to be biased toward said first pressure roller, such that a force is applied to the seam that has been formed in the lapped edge surfaces of the sheet of material.

2. A form, fill and seal machine, as set forth in claim 1 wherein said shaped confronting portions of said pair of sealer bars are shaped to complement each other and to produce a good longitudinal contact in said lapped edge surfaces of the sheet of material to be sealed.

3. A form, fill and seal machine as set forth in claim 1 wherein said sealer bars include a heat insulator wrap.

4. A form, fill and seal machine as set forth in claim 1 wherein said stop mechanism carried by said mounting mechanism is adjustable to accommodate sheet material of various thickness.

5. A form, fill and seal machine as set forth in claim 4 wherein said shaped confronting portions of said pair of sealer bars are shaped to complement each other and to produce a good longitudinal contact in said lapped edge surfaces of the sheet of material to be sealed.

6. A form, fill and seal machine, for forming a tube out of a heat sealable sheet, of the type including a longitudinal seam sealer for forming a longitudinal seam along lapped edge surfaces of said heat sealable sheet during movement of the sheet and a pair of cyclically movable jaw assemblies arranged on opposite sides of said tube that follow the movement of the tube during the sealing operation, each of said cyclically movable jaw assemblies having a right and a left side, the improvement wherein;

said longitudinal seam sealer comprises:

a pair of sealer bars each of which includes a shaped confronting portion, each sealer bar including an electric heat producing element that will when energized heat said shaped confronting portions to a temperature that will cause a seam to be formed between said lapped edge surfaces of the heat sealable sheet;

separate mounting mechanisms for each sealer bar that permit said shaped confronting portions to move toward and away from each other;

stop means preventing said shaped confronting portions from contacting each other and thus creating an unacceptable drag on said sheet of material;

a first pressure roller mounted on one of said separate mounting mechanisms at a location beyond the exit end of said shaped confronting portions said first pressure roller engaging an outer surface of the lapped edge surfaces of the sheet of material along which a seam has been formed;

a second pressure roller mounted on the other of said separate mounting mechanisms at a location beyond the exit end of said shaped confronting portions, said second pressure roller being mounted for movement on said other of said separate mounting mechanisms such that it can move toward and away from said first pressure roller, a mechanism for applying a resilient force on said second pressure roller causing it to be biased toward said first pressure roller, such that a force is applied to the seam that has been formed in the lapped edges of the heat sealable sheet; and said pair of cyclically movable jaw assemblies comprise:

each cyclically movable jaw assembly includes right and left pairs of spaced, synchronously driven, rotary drive members;

each cyclically movable jaw assembly includes a right and a left link base, such that said right and left pairs of spaced rotary drive members each has a corresponding link base;

each drive member having a crank arm secured at one end thereto and pivotally connected to the corresponding link base at its other end, such that said link bases are driven in rotary paths;

each cyclically movable jaw assembly includes a right and left pair of parallel links, arranged such that each of said right and left link bases has a corresponding pair of parallel links, each of said parallel links having first and second ends;

pivot connections at said first end of each parallel link connecting said parallel link to the corresponding link base;

pivot connections at said second end of each parallel link connecting said parallel link to the corresponding side of the corresponding cyclically movable jaw assembly;

said pivot connections include pressure devices;

said link bases, parallel links and pivot connections including said pressure devices function to bias said pair of cyclically movable jaw assemblies toward each other in arcuate paths while maintaining one jaw assembly parallel with respect to the other jaw assembly.

7. The invention as set forth in claim 6 wherein said pressure devices exert torque forces and will permit movement of said pair of cyclically movable jaws toward each other to cease while motion of said pair of cyclically movable jaws following the movement of the tube continues.

8. The invention as set forth in claim 7 wherein knife mounting brackets are secured to one set of right and left parallel links such that they move therewith, a longitudinally extending knife secure at its ends to said knife mounting brackets, said longitudinally extending knife continues to move toward the other set of right and left parallel links after the movement of cyclically movable jaw members toward each ceases and functions to cut the seal formed by said cyclically movable jaw members along its mid portion such that one portion of the seal closes the end of the completed bag and the other portion of the seal closes an end of the next bag to be formed.

9. The invention as set forth in claim 7 wherein each of said pressure devices include at least one elastic member, which when in equilibrium locates said pair of cyclically moveable jaw assemblies at an equilibrium position relative to the corresponding link bases.

10. The invention as set forth in claim 9 wherein means are provided for adjusting the pressure exerted by said cyclically movable jaws toward each other independently of said jaw assembly equilibrium position.

11. The invention as set forth in claims 9 wherein stops are provided on said link bases, each said pair of parallel links include stop engaging portions that are biased into engagement with said stops by said pressure devices, when said stops engaging portions are in engagement with said stops movement of said cyclically movable jaw assemblies to their said equilibrium position is prevented.

12. The invention as set forth in claim 11 wherein said pressure devices include at least three elastic members.

13. The invention as set forth in claim 11 wherein said stops are replaceable with stops of a different size to adjust the path over which said jaws are engaged with said tube of flexible sealable material.

14. A form fill and seal machine for packaging product in a tube type bag formed from a continuous film comprising:

a longitudinal seam sealer for continuously forming a longitudinal seam along lapped edge surfaces of said continuous film comprising:

a pair of sealer bars each of which includes a shaped confronting portion, each sealer bar including an electric heat producing element that will when energized heat said shaped confronting portions to a temperature that will cause a seam to be formed between said lapped edge surfaces of the sheet material passing there between continuous film passing there between;

separate mounting mechanisms for each sealer bar that permit said shaped confronting portions to move toward and away from each other;

stop means preventing said shaped confronting portions from contacting each other and thus creating an unacceptable drag on said sheet of material;

a first pressure roller mounted on one of said separate mounting mechanisms at a location beyond the exit end of said shaped confronting portions at which the edges of the sheet of material along which a seam has been formed;

a second pressure roller mounted on the other of said separate mounting mechanisms at a location beyond the exit end of said shaped confronting portions, said second pressure roller engaging the other outer surface of the lapped edges of the continuous film along which a seam has been formed, said second pressure roller being mounted for movement on said other of said separate mounting mechanisms such that it can move toward and away from said first pressure roller, a mechanism for applying a resilient force on said second pressure roller causing it to be biased toward said first pressure roller, such that a force is applied to the seam that has been formed in the lapped edges of the continuous film;

link bases;

a drive for driving said link bases through continuous cycles such that they have a longitudinal component of movement along said tube;

sealing jaw assemblies mounted on said link bases for movement toward and away from each other;

pressure devices mounted on said link bases and said sealing jaw assemblies exerting pressure on said sealing jaw assemblies forcing them toward each other;

said pressure devices allowing movement of said sealing jaw assemblies toward each other to cease upon contact, while permitting movement of said sealing jaw assemblies along said tube;

a programmable processor for controlling the speed of said drive during increments of said cycle to control the bag size and sealing time.

15. The invention as set forth in claim 14 wherein said pressure devices exert torque forces and will permit movement of said pair of cyclically movable jaws toward each other to cease while motion of said pair of cyclically movable jaws following the movement of the tube continues.

16. The invention as set forth in claim 15 wherein said pressure devices include at least one elastic member, which when in equilibrium locates said pair of cyclically moveable jaw assemblies at an equilibrium position relative to their corresponding link bases.

17. The invention as set forth in claim 16 wherein the invention further includes:

parallel links having first and second ends connecting said sealing jaw assemblies to said link bases;

pivot connections at said first ends of said parallel links connecting said parallel links to said link bases;

pivot connections at said second end of said parallel links connecting said parallel links to said sealing jaw assemblies;

stops on said link bases, said parallel links including stop engaging portions that are biased into engagement with said stops by said pressure devices, when said stops engaging portions are in engagement with said stops movement of said sealing jaw assemblies to said equilibrium position is prevented.

18. A form, fill and seal machine, for forming a tube out of a heat sealable sheet, of the type including a longitudinal seam sealer for continuously forming a longitudinal seam along lapped edge surfaces of said heat sealable sheet and first and second cyclically movable jaw assemblies arranged on opposite sides of said tube that follow the movement of the tube during the sealing operation and wherein said longitudinal seam sealer comprises:

a pair of sealer bars each of which includes a shaped confronting portion, each sealer bar including an electric heat producing element that will when energized heat said shaped confronting portions to a temperature that will cause a seam to be formed between said lapped edge surfaces of the heat sealable sheet passing there between;

separate mounting mechanisms for each sealer bar that permit said shaped confronting portions to move toward and away from each other;

stop means preventing said shaped confronting portions from contacting each other and thus creating an unacceptable drag on said sheet of material;

a first pressure roller mounted on one of said separate mounting mechanisms at a location beyond the exit end of said shaped confronting portions, said first pressure roller engaging an outer surface of the lapped edges of the heat sealable sheet along which a seam has been formed;

a second pressure roller mounted on the other of said separate mounting mechanisms at a location beyond the exit end of said shaped confronting portions, said second pressure roller engaging the other outer surface of the lapped edges of the heat sealable sheet along which a seam has been formed, said second pressure roller being mounted for movement on said other of said separate mounting mechanisms such that it can move toward and away from said first pressure roller, a mechanism for applying a resilient force on said second pressure roller causing it to be biased toward said first pressure roller, such that a force is applied to the seam that has been formed in the lapped edges of the heat sealable sheet; and wherein a drive for each side of said jaw assemblies comprises:

a gear case located on one side of the tube;

an input drive shaft for said gear case;

a driver gear journaled in said gear case and carried by said input drive shaft;

a first and second set of spaced output shafts drivingly connected to said first and second cyclically movable jaw assemblies respectively;

first drive gears, journaled in said gear case and secured to said first set of spaced output shafts, said first drive gears each being driven, in the same direction, by said driver gear that is carried by said input drive shaft;

second drive gears, journaled in said gear case and secured to said second set of spaced output shafts, each of said second drive gears being driven, in the same direction from and by one of said first drive gears.

19. The invention as set forth in claim 18 wherein the drive for each side of said jaw assemblies further comprises:

said first and second drive gears having the same diameter and the same number of teeth.

20. The invention as set forth in claim 18 wherein the drive for each cyclically movable jaw assembly further comprises:

a link base;

the corresponding set of spaced output shafts each having a crank arm secured at one end thereto and pivotally connected to said link base at the other end;

a pair of parallel links, said parallel links having first and second ends;

pivot connections at said first ends of the parallel links connecting said parallel links to said link base;

pivot connections at said second ends of the parallel links connecting said parallel links to a side of said cyclically movable jaw assembly;

said pivot connections including pressure devices that function to bias said cyclically movable jaw assembly toward the other cyclically movable jaw assembly.

21. The invention as set forth in claim 20 wherein the drive for each side of said jaw assemblies further comprises:

said first and second drive gears having the same diameter and the same number of teeth.

22. The invention as set forth in claim 20 wherein said pressure devices exert torque forces and will permit movement of said cyclically movable jaws assembly toward the other cyclically movable jaw assembly to cease while motion of said pair of cyclically movable jaws assemblies following the movement of the tube continues.

23. The invention as set forth in claim 22 wherein said pressure devices include at least one elastic member, which when in equilibrium locates each cyclically moveable jaw assembly at an equilibrium position relative to the corresponding link base.

24. The invention as set forth in claim 23 wherein stops are provided on said link base, said pair of parallel links include stop engaging portions that are biased into engagement with said stops by said pressure devices, when said stops engaging portions are in engagement with said stops movement of said cyclically movable jaw assembly to its said equilibrium position is prevented.

25. The invention as set forth in claim 18 wherein the drive for both sides of said cyclically movable jaw assemblies comprises:

a motor;

drives connecting said motor to said input drive shaft for each gear case;

a programmable processor for controlling said motor to thereby accommodate and adjust for tube size and sealing time.

26. The invention as set forth in claim 25 wherein the drive for each side of said jaw assemblies further comprises:

said first and second drive gears having the same diameter and the same number of teeth.

27. The invention as set forth in claim 25 wherein the drive for each cyclically movable jaw assembly further comprises:

a link base;

the corresponding set of spaced output shafts each having a crank arm secured at one end thereto and pivotally connected to said link base at the other end;

a pair of parallel links, said parallel links having first and second ends;

pivot connections at said first ends of the parallel links connecting said parallel links to said link base;

pivot connections at said second ends of the parallel links connecting said parallel links to a side of said cyclically movable jaw assembly;

said pivot connections including pressure devices that function to bias said cyclically movable jaw assembly toward the other cyclically movable jaw assembly.

28. The invention as set forth in claim 27 wherein the drive for each side of said jaw assemblies further comprises:

said first and second drive gears having the same diameter and the same number of teeth.

29. The invention as set forth in claim 27 wherein said pressure devices exert torque forces and will permit movement of said cyclically movable jaws assembly toward the other cyclically movable jaw assembly to cease while motion of said pair of cyclically movable jaws assemblies following the movement of the tube continues.

30. The invention as set forth in claim 29 wherein said pressure devices include at least one elastic member, which when in equilibrium locates said cyclically moveable jaw assembly at an equilibrium position relative to the corresponding link base.

31. The invention as set forth in claim 30 wherein stops are provided on said link base, said pair of parallel links include stop engaging portions that are biased into engagement with said stops by said pressure devices, when said stops engaging portions are in engagement with said stops movement of said cyclically movable jaw assembly to its said equilibrium position is prevented.

* * * * *

UNITED STATES PATENT AND TRADEMARK OFFICE
CERTIFICATE OF CORRECTION

PATENT NO. : 5,852,920
DATED : December 29, 1998
INVENTOR(S) : John M. Linkiewicz It is certified that error appears in the above-identified patent and that said Letters Patent is hereby corrected as shown below:

In the Claims

In claim 1, line 17, change "mechanisms" to --mechanism--.

In claim 1, line 18, change "permit" to --permits--.

In claim 14, line 12, delete " continuous film passing there between".

In claim 29, line 3, change "jaws" to --jaw--.

Signed and Sealed this

Eleventh Day of July, 2000

Attest:

Q. TODD DICKINSON

*Attesting Officer*      *Director of Patents and Trademarks*